US011347065B2

(12) United States Patent
Macnamara

(10) Patent No.: US 11,347,065 B2
(45) Date of Patent: May 31, 2022

(54) SYSTEMS AND METHODS FOR OPTICAL SYSTEMS WITH EXIT PUPIL EXPANDER

(71) Applicant: Magic Leap, Inc., Plantation, FL (US)

(72) Inventor: John Graham Macnamara, Plantation, FL (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 17/473,755

(22) Filed: Sep. 13, 2021

(65) Prior Publication Data

US 2022/0082839 A1    Mar. 17, 2022

Related U.S. Application Data

(63) Continuation of application No. 16/672,175, filed on Nov. 1, 2019, now Pat. No. 11,119,323, which is a (Continued)

(51) Int. Cl.
*G02B 27/01* (2006.01)
*F21V 8/00* (2006.01)
(Continued)

(52) U.S. Cl.
CPC ....... *G02B 27/0172* (2013.01); *G02B 6/0076* (2013.01); *G02B 27/0081* (2013.01);
(Continued)

(58) Field of Classification Search
CPC .............. G02B 27/0172; G02B 6/0076; G02B 27/0081; G02B 27/0176; G02B 6/34; G02B 2027/0125; G02B 2027/0134; G02B 2027/0154; G02B 2027/0178; G06T 19/006; G02F 1/011
See application file for complete search history.

(56) References Cited

U.S. PATENT DOCUMENTS 6,850,221 B1   2/2005   Tickle
D514,570 S     2/2006   Ohta
(Continued)

FOREIGN PATENT DOCUMENTS

CN   102654590 A   9/2012
CN   104049926 A   9/2014
(Continued)

OTHER PUBLICATIONS

International Search Report and Written Opinion for PCT Application No. PCT/US2017/52314, dated Nov. 29, 2017.
(Continued)

*Primary Examiner* — Andrew Sasinowski
(74) *Attorney, Agent, or Firm* — Fish & Richardson P.C.

(57) ABSTRACT

Architectures are provided for expanding the exit pupil of systems including one or more waveguides. Various embodiments include a display device including one or more waveguides. One or more physical/optical parameters of the one or more waveguides and/or a wavelength of light input to the waveguide can be varied as the angle at which incoming light is incident on the waveguide varies in order to maintain phase correlation between different beamlets of the output light beam emitted from the one or more waveguides.

18 Claims, 11 Drawing Sheets

Related U.S. Application Data continuation of application No. 15/710,055, filed on Sep. 20, 2017, now Pat. No. 10,481,399.

(60) Provisional application No. 62/397,759, filed on Sep. 21, 2016.

(51) Int. Cl.
  *G02B 27/00* (2006.01)
  *G06T 19/00* (2011.01)
  *G02B 6/34* (2006.01)

(52) U.S. Cl.
  CPC ........ *G02B 27/0176* (2013.01); *G06T 19/006* (2013.01); *G02B 6/34* (2013.01); *G02B 2027/0125* (2013.01); *G02B 2027/0134* (2013.01); *G02B 2027/0154* (2013.01); *G02B 2027/0178* (2013.01)

(56) References Cited

U.S. PATENT DOCUMENTS

| | | | |
|---|---|---|---|
| 8,760,762 | B1 | 6/2014 | Kelly et al. |
| 9,081,426 | B2 | 7/2015 | Armstrong |
| 9,215,293 | B2 | 12/2015 | Miller |
| D752,529 | S | 3/2016 | Loretan et al. |
| 9,348,143 | B2 | 5/2016 | Gao et al. |
| D759,657 | S | 7/2016 | Kujawski et al. |
| 9,417,452 | B2 | 8/2016 | Schowengerdt et al. |
| 9,470,906 | B2 | 10/2016 | Kaji et al. |
| 9,547,174 | B2 | 1/2017 | Gao et al. |
| 9,671,566 | B2 | 6/2017 | Abovitz et al. |
| 9,740,006 | B2 | 8/2017 | Gao |
| 9,791,700 | B2 | 10/2017 | Schowengerdt et al. |
| 9,851,563 | B2 | 12/2017 | Gao et al. |
| 9,857,591 | B2 | 1/2018 | Welch et al. |
| 9,874,749 | B2 | 1/2018 | Bradski |
| 10,481,399 | B2 | 11/2019 | Macnamara |
| 11,119,323 | B2 | 9/2021 | Macnamara |
| 2006/0028436 | A1 | 2/2006 | Armstrong |
| 2007/0081123 | A1 | 4/2007 | Lewis |
| 2011/0075963 | A1 | 3/2011 | Choi et al. |
| 2012/0127062 | A1 | 5/2012 | Bar-Zeev et al. |
| 2012/0162549 | A1 | 6/2012 | Gao et al. |
| 2013/0082922 | A1 | 4/2013 | Miller |
| 2013/0117377 | A1 | 5/2013 | Miller |
| 2013/0125027 | A1 | 5/2013 | Abovitz |
| 2013/0208234 | A1 | 8/2013 | Lewis |
| 2013/0242262 | A1 | 9/2013 | Lewis |
| 2014/0071539 | A1 | 3/2014 | Gao |
| 2014/0177023 | A1 | 6/2014 | Gao et al. |
| 2014/0218468 | A1 | 8/2014 | Gao et al. |
| 2014/0267420 | A1 | 9/2014 | Schowengerdt |
| 2014/0306866 | A1 | 10/2014 | Miller et al. |
| 2015/0016777 | A1 | 1/2015 | Abovitz et al. |
| 2015/0103306 | A1 | 4/2015 | Kaji et al. |
| 2015/0178939 | A1 | 6/2015 | Bradski et al. |
| 2015/0205126 | A1 | 7/2015 | Schowengerdt |
| 2015/0222883 | A1 | 8/2015 | Welch |
| 2015/0222884 | A1 | 8/2015 | Cheng |
| 2015/0268415 | A1 | 9/2015 | Schowengerdt et al. |
| 2015/0302652 | A1 | 10/2015 | Miller et al. |
| 2015/0309263 | A2 | 10/2015 | Abovitz et al. |
| 2015/0326570 | A1 | 11/2015 | Publicover et al. |
| 2015/0346490 | A1 | 12/2015 | TeKolste et al. |
| 2015/0346495 | A1 | 12/2015 | Welch et al. |
| 2016/0011419 | A1 | 1/2016 | Gao |
| 2016/0026253 | A1 | 1/2016 | Bradski et al. |
| 2016/0103324 | A1 | 4/2016 | Arakawa et al. |
| 2016/0231568 | A1 | 8/2016 | Saarikko et al. |
| 2017/0176835 | A1* | 6/2017 | Gupta ................. G06F 3/0412 |
| 2017/0184897 | A1* | 6/2017 | Rho .................... G02F 1/13458 |
| 2017/0331071 | A1* | 11/2017 | Han ...................... G02B 5/223 |
| 2017/0364194 | A1* | 12/2017 | Jang ..................... H01L 27/3262 |
| 2018/0120566 | A1 | 5/2018 | Macnamara |
| 2020/0142197 | A1 | 5/2020 | Macnamara |

FOREIGN PATENT DOCUMENTS

| | | |
|---|---|---|
| CN | 104169749 A | 11/2014 |
| CN | 105700143 A | 6/2016 |
| CN | 105842843 A | 8/2016 |
| CN | 105934902 A | 9/2016 |
| WO | WO 2013/188464 | 12/2013 |
| WO | WO 2015/081313 | 6/2015 |
| WO | WO 2016/105285 | 6/2016 |
| WO | WO 2018/057528 | 3/2018 |

OTHER PUBLICATIONS

International Preliminary Report on Patentability for PCT Application No. PCT/US2017/52314, dated Mar. 26, 2019.

ARToolKit: https://web.archive.org/web/20051013062315/http://www.hitl.washington.edu:80/artoolkit/documentation/hardware.htm, archived Oct. 13, 2005.

Azuma, "A Survey of Augmented Reality," Teleoperators and Virtual Environments 6, 4 (Aug. 1997), pp. 355-385. https://web.archive.org/web/20010604100006/http://www.cs.unc.edu/~azuma/ARpresence.pdf.

Azuma, "Predictive Tracking for Augmented Realty," TR95-007, Department of Computer Science, UNC-Chapel Hill, NC, Feb. 1995.

Bimber, et al., "Spatial Augmented Reality—Merging Real and Virtual Worlds," 2005 https://web.media.mit.edu/~raskar/book/BimberRaskarAugmentedRealityBook.pdf.

Jacob, "Eye Tracking in Advanced Interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).

Tanriverdi and Jacob, "Interacting With Eye Movements in Virtual Environments," Department of Electrical Engineering and Computer Science, Tufts University, Medford, MA—paper/Proc. ACM CHI 2000 Human Factors in Computing Systems Conference, pp. 265-272, Addison-Wesley/ACM Press (2000).

* cited by examiner

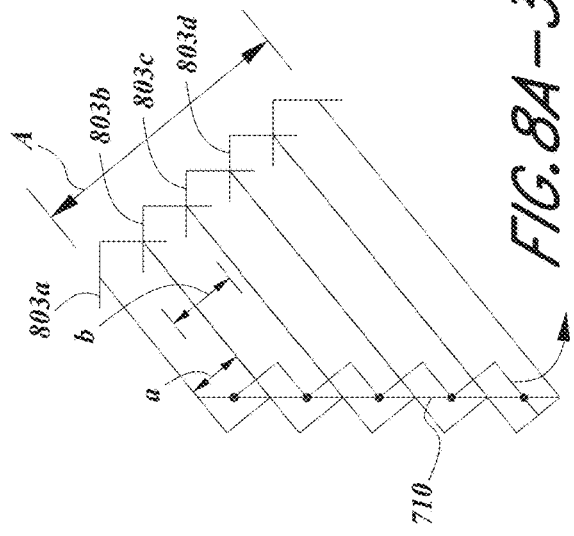
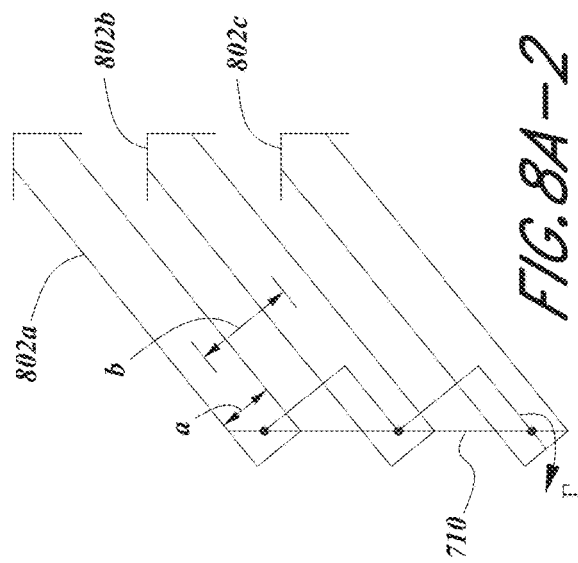
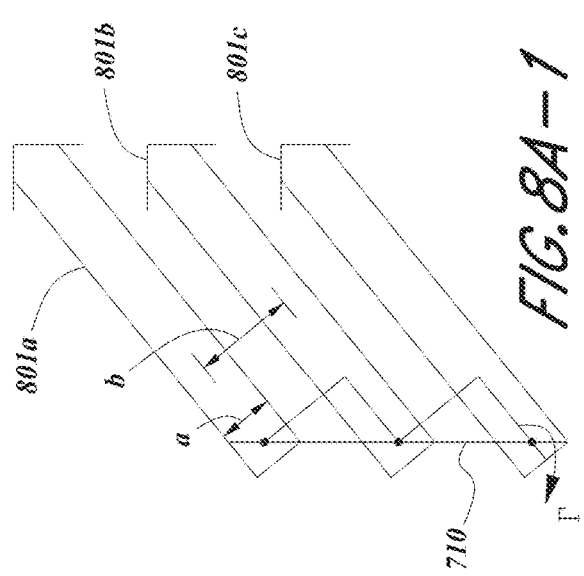
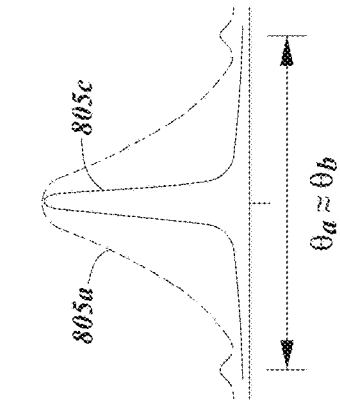
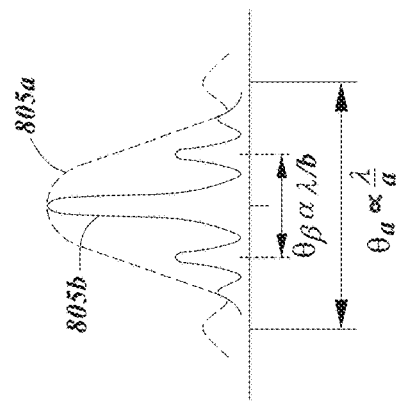
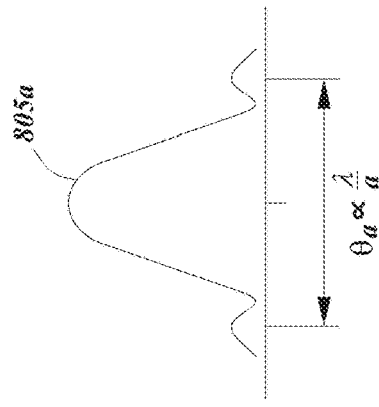

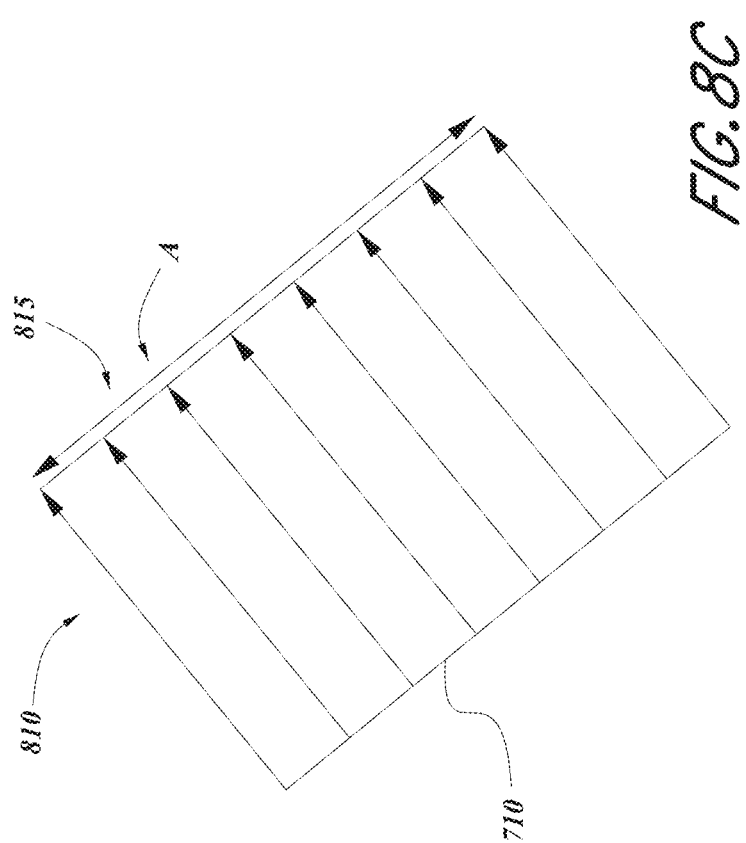

SYSTEMS AND METHODS FOR OPTICAL SYSTEMS WITH EXIT PUPIL EXPANDER

INCORPORATION BY REFERENCE

This application is a continuation of U.S. application Ser. No. 16/672,175 filed on Nov. 1, 2019 entitled "SYSTEMS AND METHODS FOR OPTICAL SYSTEMS WITH EXIT PUPIL EXPANDER," which is a continuation of U.S. application Ser. No. 15/710,055 filed on Sep. 20, 2017 entitled "SYSTEMS AND METHODS FOR OPTICAL SYSTEMS WITH EXIT PUPIL EXPANDER," which claims the priority benefit of U.S. Provisional Patent Application No. 62/397,759 filed on Sep. 21, 2016 entitled "SYSTEMS AND METHODS FOR OPTICAL SYSTEMS WITH EXIT PUPIL EXPANDER." The applications recited above are each incorporated by reference herein in their entirety.

BACKGROUND

Field

The present disclosure relates to virtual reality and augmented reality imaging and visualization systems.

Description of the Related Art

Modern computing and display technologies have facilitated the development of systems for so called "virtual reality" or "augmented reality" experiences, wherein digitally reproduced images or portions thereof are presented to a user in a manner wherein they seem to be, or may be perceived as, real. A virtual reality, or "VR", scenario typically involves presentation of digital or virtual image information without transparency to other actual real-world visual input; an augmented reality, or "AR", scenario typically involves presentation of digital or virtual image information as an augmentation to visualization of the actual world around the user. For example, referring to FIG. 1, an augmented reality scene 1000 is depicted wherein a user of an AR technology sees a real-world park-like setting 1100 featuring people, trees, buildings in the background, and a concrete platform 1120. In addition to these items, the user of the AR technology also perceives that he "sees" a robot statue 1110 standing upon the real-world platform 1120, and a cartoon-like avatar character 1130 flying by which seems to be a personification of a bumble bee, even though these elements do not exist in the real world. As it turns out, the human visual perception system is very complex, and producing a VR or AR technology that facilitates a comfortable, natural-feeling, rich presentation of virtual image elements amongst other virtual or real-world imagery elements is challenging. Systems and methods disclosed herein address various challenges related to VR and AR technology.

SUMMARY

An innovative aspect of the subject matter disclosed herein is implemented in an optical system comprising an image projection system, a waveguide; and a control system. The image projection system is configured to emit a coherent beam of light at a plurality of wavelengths in the visible spectral range. The waveguide comprises a first edge, a second edge and a pair of reflective surfaces disposed between the first and the second edges. The pair of reflective surfaces is separated by a gap having a gap height d. The waveguide comprises a material having a refractive index n. The pair of reflective surfaces has a reflectivity r. The beam emitted from the image projection system is coupled into the waveguide at an input angle $\theta$. The input light can be coupled through one of the first or the second edge or through one of the reflective surfaces. The control system is configured to vary at least one parameter selected from the group consisting of: a wavelength from the plurality of wavelengths, the gap height d, the refractive index n and the reflectivity r. The variation of the at least one parameter is correlated with variation in the input angle $\theta$.

In various embodiments of the optical system the image projection system can be configured to vary the input angle $\theta$ of emitted beam at a scan rate. The control system can be configured to modulate the at least one parameter at a modulation rate substantially equal to the scan rate. The control system can be configured to modulate the at least one parameter, the modulation rate configured such that the equation $2nd \sin \theta = m\lambda$ is satisfied for all values of the input angle $\theta$, wherein m is an integer and $\lambda$ is wavelength of the beam. In various embodiments, the least one parameter can be a wavelength from the plurality of wavelengths. In some embodiments, the least one parameter can be the gap height d. In various embodiments, the least one parameter can be the refractive index n. In some embodiments, the least one parameter can be the reflectivity r. In various embodiments, the image projection system can comprise a fiber. In various embodiments, the emitted beam can be collimated. The plurality of wavelengths can comprise wavelengths in the red, green and blue spectral regions. The waveguide can comprise an acousto-optic material, a piezo-electric material, an electro-optic material or a micro-electro mechanical system (MEMS). The waveguide can be configured as an exit pupil expander that expands and multiplies the emitted beam. The waveguide can be configured to expand the beam to a spot size greater than 1 mm. Various embodiments of the optical system discussed herein can be integrated in an augmented reality (AR) device, a virtual reality (VR) device, a near-to-eye display device, or an eyewear comprising at least one of: a frame, one or more lenses or ear stems.

An innovative aspect of the subject matter disclosed herein is implemented in an optical system comprising an image projection system, a plurality of stacked waveguides, and a control system. The image projection system is configured to emit a coherent beam of light at a plurality of wavelengths in the visible spectral range. Each waveguide of the plurality of stacked waveguides comprises a first edge, a second edge and a pair of reflective surfaces disposed between the first and the second edges. The pair of reflective surfaces is separated by a gap having a gap height d. The waveguide comprises a material having a refractive index n. The pair of reflective surfaces has a reflectivity r. The control system is configured to vary at least one parameter selected from the group consisting of: a wavelength from the plurality of wavelengths, the gap height d, the refractive index n and the reflectivity r. The beam emitted from the image projection system is coupled into the waveguide at an input angle $\theta$. The input light can be coupled through one of the first or the second edge or through one of the reflective surfaces. The variation of the at least one parameter is correlated with variation in the input angle $\theta$.

In various embodiments, each waveguide of the plurality of stacked waveguides can have an associated depth plane. The beam emitted from each waveguide can appear to originate from that waveguide's associated depth plane. The different waveguides from the plurality of stacked waveguides can have different associated depth planes. Various embodiments of the optical system discussed above can be integrated in an augmented reality (AR) device, a virtual reality (VR) device, a near-to-eye display device, or an eyewear comprising at least one of: a frame, one or more lenses or ear stems.

Details of one or more implementations of the subject matter described in this specification are set forth in the accompanying drawings and the description below. Other features, aspects, and advantages will become apparent from the description, the drawings, and the claims. Neither this summary nor the following detailed description purports to define or limit the scope of the inventive subject matter.

BRIEF DESCRIPTION OF THE DRAWINGS

FIG. 8A-1 illustrates light output from an embodiment of a waveguide receiving light from an incoherent light source. FIG. 8B-1 illustrates the point spread function of the light output from the waveguide depicted in FIG. 8A-1.

FIG. 8A-2 illustrates light output from an embodiment of a waveguide receiving light from a coherent light source. FIG. 8B-2 illustrates the point spread function of the light output from the waveguide depicted in FIG. 8A-2.

FIG. 8A-3 illustrates light output from an embodiment of a waveguide receiving light from a coherent light source. FIG. 8B-3 illustrates the point spread function of the light output from the waveguide depicted in FIG. 8A-3.

FIG. 8C illustrates a light beam with a continuous wavefront having a uniform phase that is output from an embodiment of a waveguide that receives light from a coherent input light source and wherein the optical path length difference between the beams that form the output light beam is an integral multiple of the wavelength of the incident light.

FIG. 9B-1 illustrates an embodiment of a waveguide comprising three layers, each layer having a variable reflectivity.

The drawings are provided to illustrate certain example embodiments and are not intended to limit the scope of the disclosure. Like numerals refer to like parts throughout.

DETAILED DESCRIPTION

Overview

In order for a three-dimensional (3D) display to produce a true sensation of depth, and more specifically, a simulated sensation of surface depth, it is desirable for each point in the display's visual field to generate the accommodative response corresponding to its virtual depth. If the accommodative response to a display point does not correspond to the virtual depth of that point, as determined by the binocular depth cues of convergence and stereopsis, the human eye may experience an accommodation conflict, resulting in unstable imaging, harmful eye strain, headaches, and, in the absence of accommodation information, almost a complete lack of surface depth.

VR and AR experiences can be provided by display systems having displays in which images corresponding to a plurality of depth planes are provided to a viewer. The images may be different for each depth plane (e.g., provide slightly different presentations of a scene or object) and may be separately focused by the viewer's eyes, thereby helping to provide the user with depth cues based on the accommodation of the eye required to bring into focus different image features for the scene located on different depth plane and/or based on observing different image features on different depth planes being out of focus. As discussed elsewhere herein, such depth cues provide credible perceptions of depth.

Figure 2:
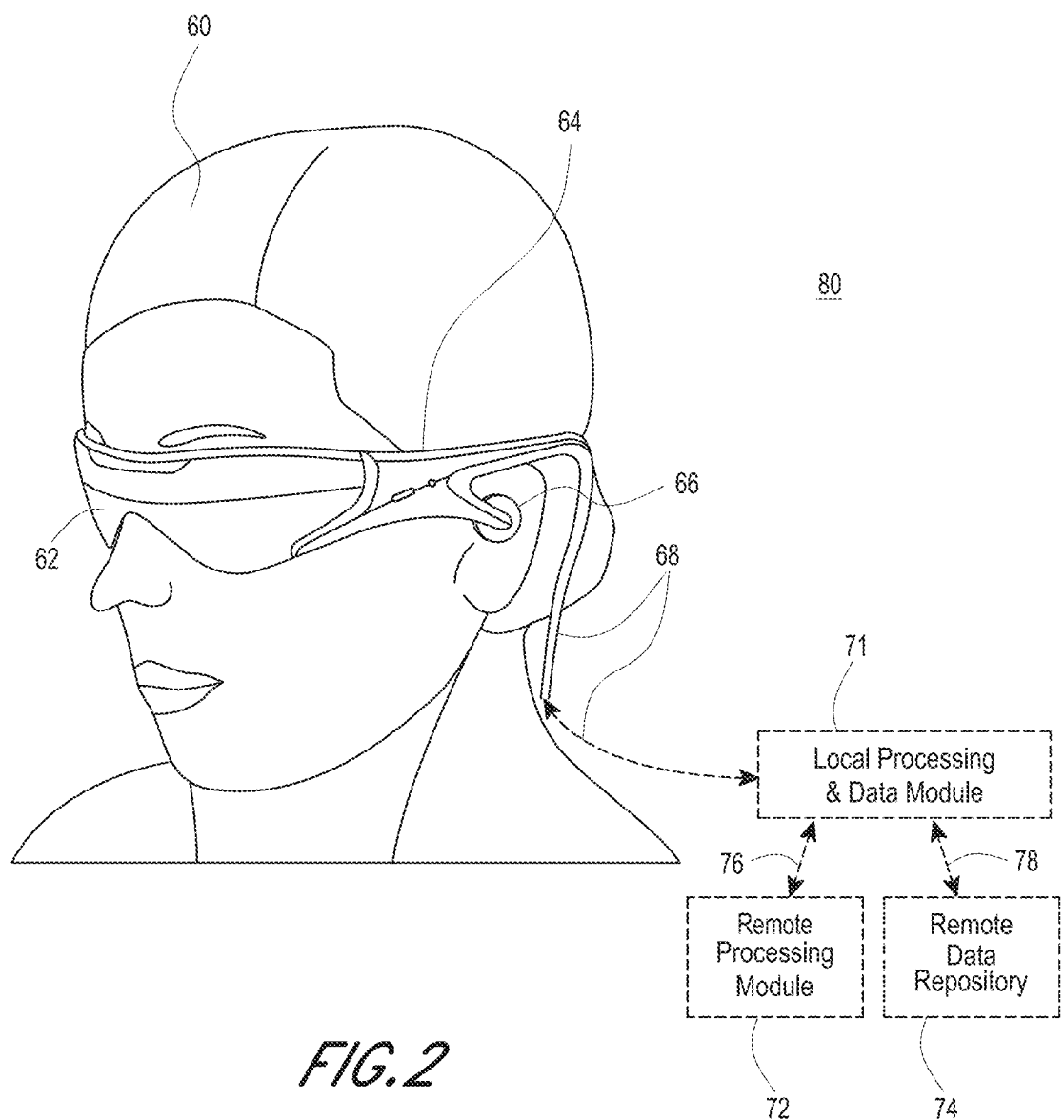
FIG. 2 schematically illustrates an example of a wearable display system.

FIG. 2 illustrates an example of wearable display system 80. The display system 80 includes a display 62, and various mechanical and electronic modules and systems to support the functioning of display 62. The display 62 may be coupled to a frame 64, which is wearable by a display system user, wearer, or viewer 60 and which is configured to position the display 62 in front of the eyes of the user 60. In some embodiments, a speaker 66 is coupled to the frame 64 and positioned adjacent the ear canal of the user (in some embodiments, another speaker, not shown, is positioned adjacent the other ear canal of the user to provide for stereo/shapeable sound control). The display 62 is operatively coupled 68, such as by a wired lead or wireless connectivity, to a local data processing module 71 which may be mounted in a variety of configurations, such as fixedly attached to the frame 64, fixedly attached to a helmet or hat worn by the user, embedded in headphones, or otherwise removably attached to the user 60 (e.g., in a backpack-style configuration, in a belt-coupling style configuration).

The local processing and data module 71 may comprise a hardware processor, as well as digital memory, such as non-volatile memory (e.g., flash memory), both of which may be utilized to assist in the processing, caching, and storage of data. The data may include data a) captured from sensors (which may be, e.g., operatively coupled to the frame 64 or otherwise attached to the user 60), such as image capture devices (e.g., cameras), microphones, inertial measurement units, accelerometers, compasses, global positioning system (GPS) units, radio devices, and/or gyroscopes; and/or b) acquired and/or processed using remote processing module 72 and/or remote data repository 74, possibly for passage to the display 62 after such processing or retrieval. The local processing and data module 71 may be operatively coupled by communication links 76 and/or 78, such as via wired or wireless communication links, to the remote processing module 72 and/or remote data repository 74 such that these remote modules are available as resources to the local processing and data module (71). In addition, remote processing module 72 and remote data repository 74 may be operatively coupled to each other.

In some embodiments, the remote processing module 72 may comprise one or more processors configured to analyze and process data and/or image information. In some embodiments, the remote data repository 74 may comprise a digital data storage facility, which may be available through the internet or other networking configuration in a "cloud" resource configuration. In some embodiments, all data is stored and all computations are performed in the local processing and data module, allowing fully autonomous use from a remote module.

The human visual system is complicated and providing a realistic perception of depth is challenging. Without being limited by theory, it is believed that viewers of an object may perceive the object as being three-dimensional due to a combination of vergence and accommodation. Vergence movements (e.g., rotational movements of the pupils toward or away from each other to converge the lines of sight of the eyes to fixate upon an object) of the two eyes relative to each other are closely associated with focusing (or "accommodation") of the lenses of the eyes. Under normal conditions, changing the focus of the lenses of the eyes, or accommodating the eyes, to change focus from one object to another object at a different distance will automatically cause a matching change in vergence to the same distance, under a relationship known as the "accommodation-vergence reflex." Likewise, a change in vergence will trigger a matching change in accommodation, under normal conditions. Display systems that provide a better match between accommodation and vergence may form more realistic or comfortable simulations of three-dimensional imagery.

Figure 3:
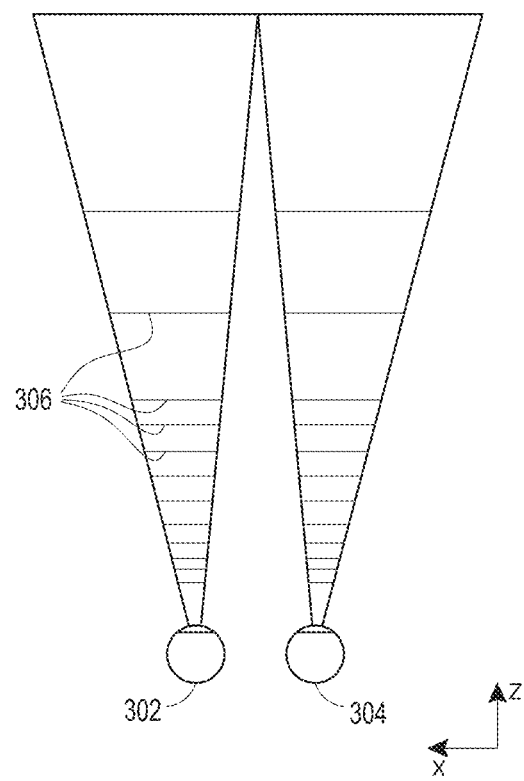
FIG. 3 schematically illustrates aspects of an approach for simulating three-dimensional imagery using multiple depth planes.

FIG. 3 illustrates aspects of an approach for simulating three-dimensional imagery using multiple depth planes. With reference to FIG. 3, objects at various distances from eyes 302 and 304 on the z-axis are accommodated by the eyes 302 and 304 so that those objects are in focus. The eyes 302 and 304 assume particular accommodated states to bring into focus objects at different distances along the z-axis. Consequently, a particular accommodated state may be said to be associated with a particular one of depth planes 306, with has an associated focal distance, such that objects or parts of objects in a particular depth plane are in focus when the eye is in the accommodated state for that depth plane. In some embodiments, three-dimensional imagery may be simulated by providing different presentations of an image for each of the eyes 302 and 304, and also by providing different presentations of the image corresponding to each of the depth planes. While shown as being separate for clarity of illustration, it will be appreciated that the fields of view of the eyes 302 and 304 may overlap, for example, as distance along the z-axis increases. In addition, while shown as flat for ease of illustration, it will be appreciated that the contours of a depth plane may be curved in physical space, such that all features in a depth plane are in focus with the eye in a particular accommodated state. Without being limited by theory, it is believed that the human eye typically can interpret a finite number of depth planes to provide depth perception. Consequently, a highly believable simulation of perceived depth may be achieved by providing, to the eye, different presentations of an image corresponding to each of these limited number of depth planes.

Waveguide Stack Assembly

Figure 4:
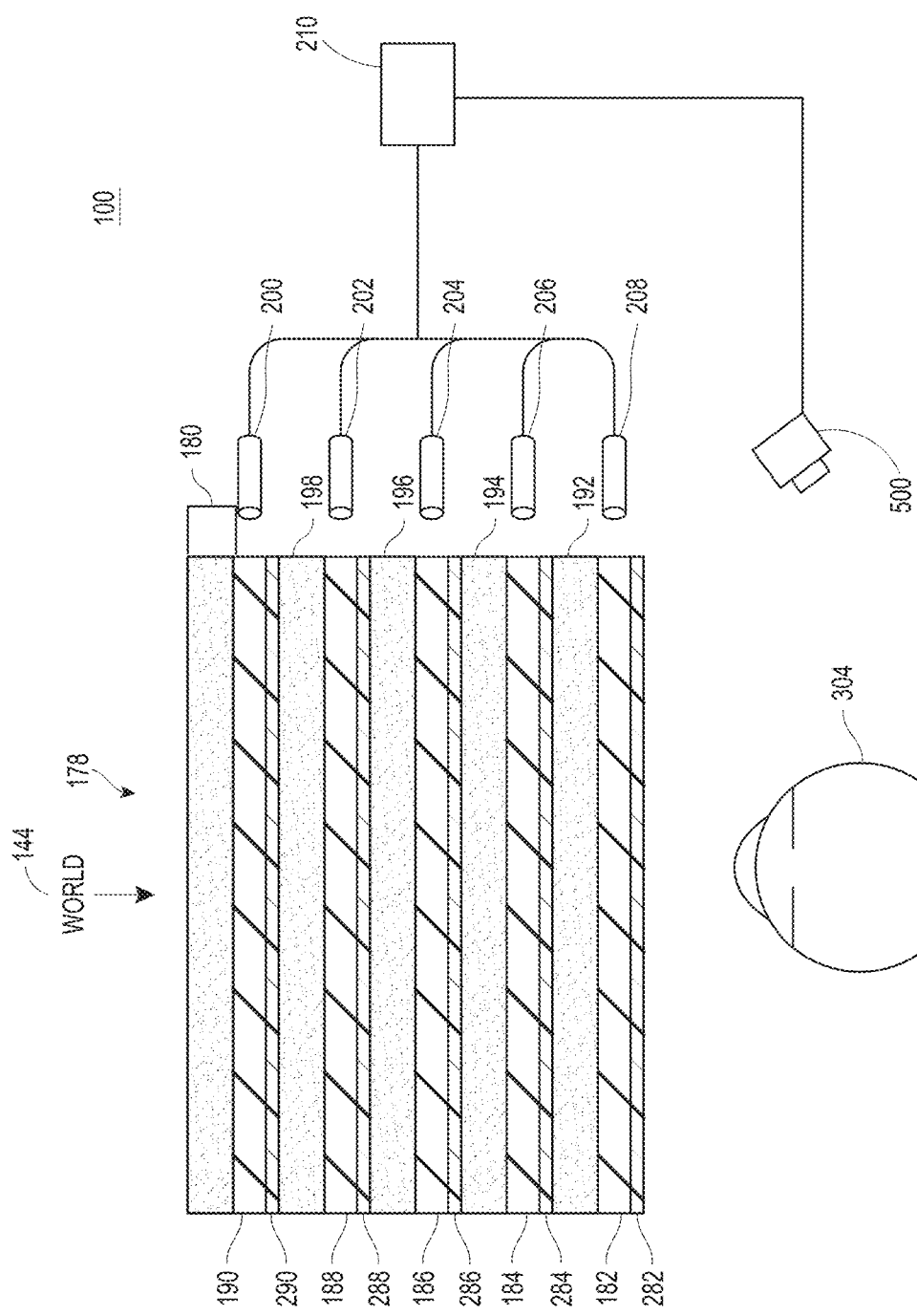
FIG. 4 schematically illustrates an example of a waveguide stack for outputting image information to a user.

FIG. 4 illustrates an example of a waveguide stack for outputting image information to a user. A display system 100 includes a stack of waveguides, or stacked waveguide assembly, 178 that may be utilized to provide three-dimensional perception to the eye/brain using a plurality of waveguides 182, 184, 186, 188, 190. In some embodiments, the display system 100 may correspond to system 80 of FIG. 2, with FIG. 4 schematically showing some parts of that system 80 in greater detail. For example, in some embodiments, the waveguide assembly 178 may be integrated into the display 62 of FIG. 2.

With continued reference to FIG. 4, the waveguide assembly 178 may also include a plurality of features 198, 196, 194, 192 between the waveguides. In some embodiments, the features 198, 196, 194, 192 may be lenses. The waveguides 182, 184, 186, 188, 190 and/or the plurality of lenses 198, 196, 194, 192 may be configured to send image information to the eye with various levels of wavefront curvature or light ray divergence. Each waveguide level may be associated with a particular depth plane and may be configured to output image information corresponding to that depth plane. Image injection devices 200, 202, 204, 206, 208 may be utilized to inject image information into the waveguides 182, 184, 186, 188, 190, each of which may be configured to distribute incoming light across each respective waveguide, for output toward the eye 304. Light exits an output surface of the image injection devices 200, 202, 204, 206, 208 and is injected into a corresponding input edge of the waveguides 182, 184, 186, 188, 190. In some embodiments, a single beam of light (e.g., a collimated beam) may be injected into each waveguide to output an entire field of cloned collimated beams that are directed toward the eye 304 at particular angles (and amounts of divergence) corresponding to the depth plane associated with a particular waveguide.

In some embodiments, the image injection devices 200, 202, 204, 206, 208 are discrete displays that each produce image information for injection into a corresponding waveguide 182, 184, 186, 188, 190, respectively. In some other embodiments, the image injection devices 200, 202, 204, 206, 208 are the output ends of a single multiplexed display which may, e.g., pipe image information via one or more optical conduits (such as fiber optic cables) to each of the image injection devices 200, 202, 204, 206, 208.

A controller 210 controls the operation of the stacked waveguide assembly 178 and the image injection devices 200, 202, 204, 206, 208. In some embodiments, the controller 210 includes programming (e.g., instructions in a non-transitory computer-readable medium) that regulates the timing and provision of image information to the waveguides 182, 184, 186, 188, 190. In some embodiments, the controller may be a single integral device, or a distributed system connected by wired or wireless communication channels. The controller 210 may be part of the processing modules 71 or 72 (illustrated in FIG. 2) in some embodiments.

The waveguides 182, 184, 186, 188, 190 may be configured to propagate light within each respective waveguide by total internal reflection (TIR). The waveguides 182, 184, 186, 188, 190 may each be planar or have another shape (e.g., curved), with major top and bottom surfaces and edges extending between those major top and bottom surfaces. In the illustrated configuration, the waveguides 182, 184, 186, 188, 190 may each include light extracting optical elements 282, 284, 286, 288, 290 that are configured to extract light out of a waveguide by redirecting the light, propagating within each respective waveguide, out of the waveguide to output image information to the eye 304. Extracted light may also be referred to as outcoupled light, and light extracting optical elements may also be referred to as outcoupling optical elements. An extracted beam of light is outputted by the waveguide at locations at which the light propagating in the waveguide strikes a light redirecting element. The light extracting optical elements 82, 284, 286, 288, 290 may, for example, be reflective and/or diffractive optical features. While illustrated disposed at the bottom major surfaces of the waveguides 182, 184, 186, 188, 190 for ease of description and drawing clarity, in some embodiments, the light extracting optical elements 282, 284, 286, 288, 290 may be disposed at the top and/or bottom major surfaces, and/or may be disposed directly in the volume of the waveguides 182, 184, 186, 188, 190. In some embodiments, the light extracting optical elements 282, 284, 286, 288, 290 may be formed in a layer of material that is attached to a transparent substrate to form the waveguides 182, 184, 186, 188, 190. In some other embodiments, the waveguides 182, 184, 186, 188, 190 may be a monolithic piece of material and the light extracting optical elements 282, 284, 286, 288, 290 may be formed on a surface and/or in the interior of that piece of material.

With continued reference to FIG. 4, as discussed herein, each waveguide 182, 184, 186, 188, 190 is configured to output light to form an image corresponding to a particular depth plane. For example, the waveguide 182 nearest the eye may be configured to deliver collimated light, as injected into such waveguide 182, to the eye 304. The collimated light may be representative of the optical infinity focal plane. The next waveguide up 184 may be configured to send out collimated light which passes through the first lens 192 (e.g., a negative lens) before it can reach the eye 304. First lens 192 may be configured to create a slight convex wavefront curvature so that the eye/brain interprets light coming from that next waveguide up 184 as coming from a first focal plane closer inward toward the eye 304 from optical infinity. Similarly, the third up waveguide 186 passes its output light through both the first lens 192 and second lens 194 before reaching the eye 304. The combined optical power of the first and second lenses 192 and 194 may be configured to create another incremental amount of wavefront curvature so that the eye/brain interprets light coming from the third waveguide 186 as coming from a second focal plane that is even closer inward toward the person from optical infinity than was light from the next waveguide up 184.

The other waveguide layers (e.g., waveguides 188, 190) and lenses (e.g., lenses 196, 198) are similarly configured, with the highest waveguide 190 in the stack sending its output through all of the lenses between it and the eye for an aggregate focal power representative of the closest focal plane to the person. To compensate for the stack of lenses 198, 196, 194, 192 when viewing/interpreting light coming from the world 144 on the other side of the stacked waveguide assembly 178, a compensating lens layer 180 may be disposed at the top of the stack to compensate for the aggregate power of the lens stack 198, 196, 194, 192 below. Such a configuration provides as many perceived focal planes as there are available waveguide/lens pairings. Both the light extracting optical elements of the waveguides and the focusing aspects of the lenses may be static (e.g., not dynamic or electro-active). In some alternative embodiments, either or both may be dynamic using electro-active features.

With continued reference to FIG. 4, the light extracting optical elements 282, 284, 286, 288, 290 may be configured to both redirect light out of their respective waveguides and to output this light with the appropriate amount of divergence or collimation for a particular depth plane associated with the waveguide. As a result, waveguides having different associated depth planes may have different configurations of light extracting optical elements, which output light with a different amount of divergence depending on the associated depth plane. In some embodiments, as discussed herein, the light extracting optical elements 282, 284, 286, 288, 290 may be volumetric or surface features, which may be configured to output light at specific angles. For example, the light extracting optical elements 282, 284, 286, 288, 290 may be volume holograms, surface holograms, and/or diffraction gratings. Light extracting optical elements, such as diffraction gratings, are described in U.S. Patent Publication No. 2015/0178939, published Jun. 25, 2015, which is incorporated by reference herein in its entirety. In some embodiments, the features 198, 196, 194, 192 may not be lenses. Rather, they may simply be spacers (e.g., cladding layers and/or structures for forming air gaps).

In some embodiments, the light extracting optical elements 282, 284, 286, 288, 290 are diffractive features that form a diffraction pattern, or "diffractive optical element" (also referred to herein as a "DOE"). Preferably, the DOEs have a relatively low diffraction efficiency so that only a portion of the light of the beam is deflected away toward the eye 304 with each intersection of the DOE, while the rest continues to move through a waveguide via total internal reflection. The light carrying the image information is thus divided into a number of related exit beams that exit the waveguide at a multiplicity of locations and the result is a fairly uniform pattern of exit emission toward the eye 304 for this particular collimated beam bouncing around within a waveguide.

In some embodiments, one or more DOEs may be switchable between "on" states in which they actively diffract, and "off" states in which they do not significantly diffract. For instance, a switchable DOE may comprise a layer of polymer dispersed liquid crystal, in which microdroplets comprise a diffraction pattern in a host medium, and the refractive index of the microdroplets can be switched to substantially match the refractive index of the host material (in which case the pattern does not appreciably diffract incident light) or the microdroplet can be switched to an index that does not match that of the host medium (in which case the pattern actively diffracts incident light).

In some embodiments, the number and distribution of depth planes and/or depth of field may be varied dynamically based on the pupil sizes and/or orientations of the eyes of the viewer. In some embodiments, a camera 500 (e.g., a digital camera) may be used to capture images of the eye 304 to determine the size and/or orientation of the pupil of the eye 304. The camera 500 can be used to obtain images for use in determining the direction the wearer 60 is looking (e.g., eye pose) or for biometric identification of the wearer (e.g., via iris identification). In some embodiments, the camera 500 may be attached to the frame 64 (as illustrated in FIG. 2) and may be in electrical communication with the processing modules 71 and/or 72, which may process image information from the camera 500 to determine, e.g., the pupil diameters and/or orientations of the eyes of the user 60. In some embodiments, one camera 500 may be utilized for each eye, to separately determine the pupil size and/or orientation of each eye, thereby allowing the presentation of image information to each eye to be dynamically tailored to that eye. In some other embodiments, the pupil diameter and/or orientation of only a single eye 304 (e.g., using only a single camera 500 per pair of eyes) is determined and assumed to be similar for both eyes of the viewer 60.

For example, depth of field may change inversely with a viewer's pupil size. As a result, as the sizes of the pupils of the viewer's eyes decrease, the depth of field increases such that one plane not discernible because the location of that plane is beyond the depth of focus of the eye may become discernible and appear more in focus with reduction of pupil size and commensurate increase in depth of field. Likewise, the number of spaced apart depth planes used to present different images to the viewer may be decreased with decreased pupil size. For example, a viewer may not be able to clearly perceive the details of both a first depth plane and a second depth plane at one pupil size without adjusting the accommodation of the eye away from one depth plane and to the other depth plane. These two depth planes may, however, be sufficiently in focus at the same time to the user at another pupil size without changing accommodation.

In some embodiments, the display system may vary the number of waveguides receiving image information based upon determinations of pupil size and/or orientation, or upon receiving electrical signals indicative of particular pupil sizes and/or orientations. For example, if the user's eyes are unable to distinguish between two depth planes associated with two waveguides, then the controller 210 may be configured or programmed to cease providing image information to one of these waveguides. Advantageously, this may reduce the processing burden on the system, thereby increasing the responsiveness of the system. In embodiments in which the DOEs for a waveguide are switchable between on and off states, the DOEs may be switched to the off state when the waveguide does receive image information.

In some embodiments, it may be desirable to have an exit beam meet the condition of having a diameter that is less than the diameter of the eye of a viewer. However, meeting this condition may be challenging in view of the variability in size of the viewer's pupils. In some embodiments, this condition is met over a wide range of pupil sizes by varying the size of the exit beam in response to determinations of the size of the viewer's pupil. For example, as the pupil size decreases, the size of the exit beam may also decrease. In some embodiments, the exit beam size may be varied using a variable aperture.

Figure 5:
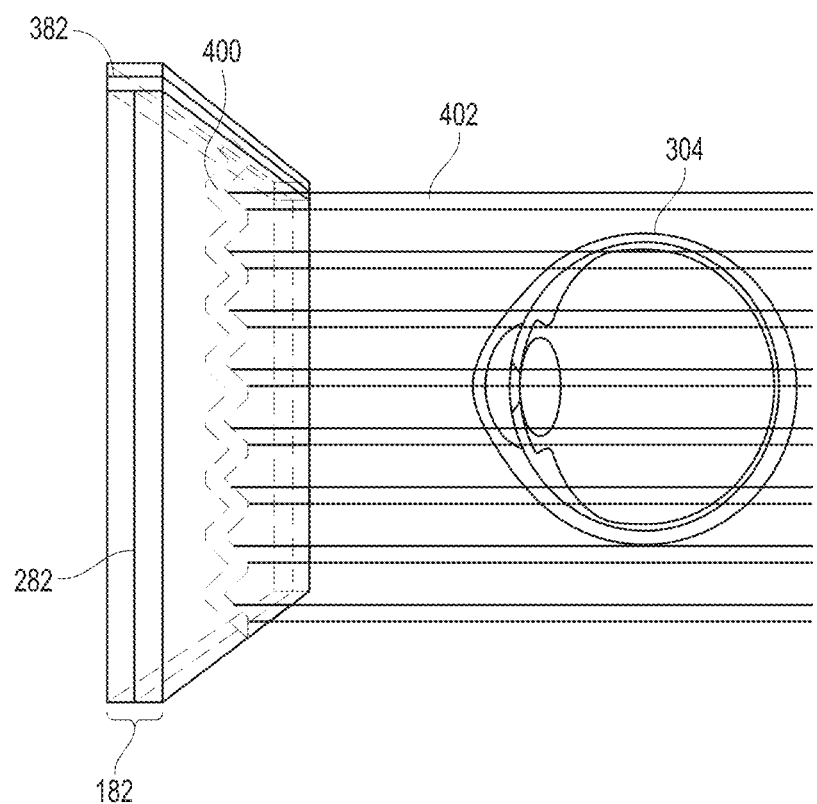
FIG. 5 shows example exit beams that may be outputted by a waveguide.

FIG. 5 shows an example of exit beams outputted by a waveguide. One waveguide is illustrated, but it will be appreciated that other waveguides in the waveguide assembly 178 may function similarly, where the waveguide assembly 178 includes multiple waveguides. Light 400 is injected into the waveguide 182 at the input edge 382 of the waveguide 182 and propagates within the waveguide 182 by TIR. At points where the light 400 impinges on the DOE 282, a portion of the light exits the waveguide as exit beams 402. The exit beams 402 are illustrated as substantially parallel but they may also be redirected to propagate to the eye 304 at an angle (e.g., forming divergent exit beams), depending on the depth plane associated with the waveguide 182. It will be appreciated that substantially parallel exit beams may be indicative of a waveguide with light extracting optical elements that outcouple light to form images that appear to be set on a depth plane at a large distance (e.g., optical infinity) from the eye 304. Other waveguides or other sets of light extracting optical elements may output an exit beam pattern that is more divergent, which would require the eye 304 to accommodate to a closer distance to bring it into focus on the retina and would be interpreted by the brain as light from a distance closer to the eye 304 than optical infinity.

Figure 6:
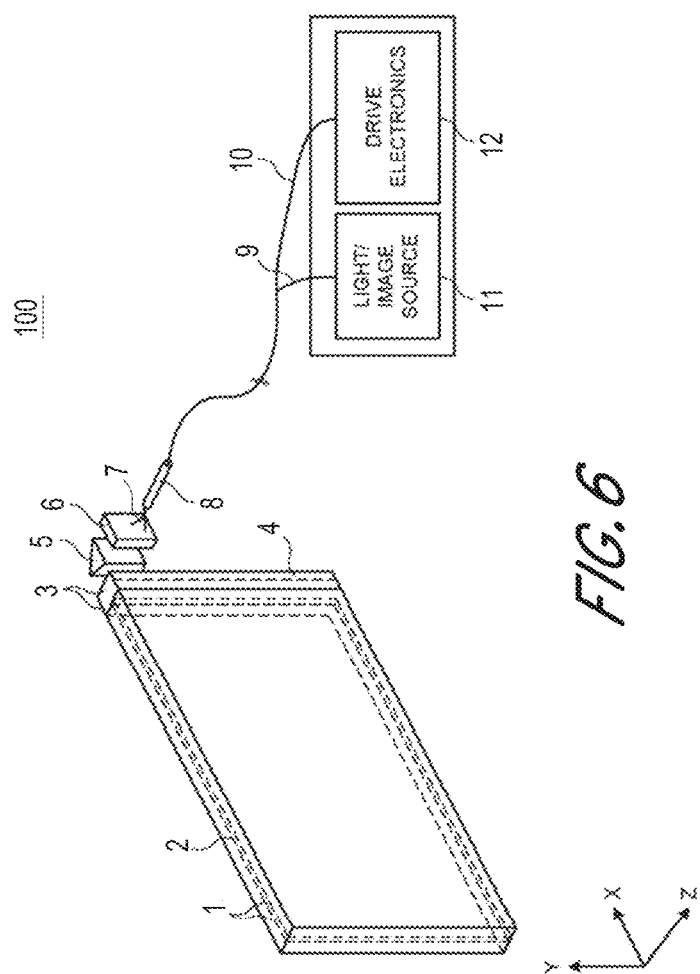
FIG. 6 is a schematic diagram showing an optical system including a waveguide apparatus, an optical coupler subsystem to optically couple light to or from the waveguide apparatus, and a control subsystem, used in the generation of a multi-focal volumetric display, image, or light field.

FIG. 6 shows another example of the optical display system 100 including a waveguide apparatus, an optical coupler subsystem to optically couple light to or from the waveguide apparatus, and a control subsystem. The optical system 100 can be used to generate a multi-focal volumetric, image, or light field. The optical system can include one or more primary planar waveguides 1 (only one is shown in FIG. 6) and one or more DOEs 2 associated with each of at least some of the primary waveguides 1. The planar waveguides 1 can be similar to the waveguides 182, 184, 186, 188, 190 discussed with reference to FIG. 4. The optical system may employ a distribution waveguide apparatus, to relay light along a first axis (vertical or Y-axis in view of FIG. 6). In various embodiments, the distribution waveguide apparatus may be configured to expand the light's effective exit pupil along the first axis (e.g., Y-axis) and/or expand the area in which a viewer can position his eyes to view the optical display system (also referred to herein as eyebox). The distribution waveguide apparatus, may, for example include a distribution planar waveguide 3 and at least one DOE 4 (illustrated by double dash-dot line) associated with the distribution planar waveguide 3. The distribution planar waveguide 3 may be similar or identical in at least some respects to the primary planar waveguide 1, having a different orientation therefrom. Likewise, the at least one DOE 4 may be similar or identical in at least some respects to the DOE 2. For example, the distribution planar waveguide 3 and/or DOE 4 may be comprised of the same materials as the primary planar waveguide 1 and/or DOE 2, respectively. Embodiments of the optical display system 100 shown in FIG. 4 or 6 can be integrated into the wearable display system 80 shown in FIG. 2.

The relayed and exit-pupil expanded light is optically coupled from the distribution waveguide apparatus into the one or more primary planar waveguides 1. The primary planar waveguide 1 relays light along a second axis, preferably orthogonal to first axis, (e.g., horizontal or X-axis in view of FIG. 6). Notably, the second axis can be a non-orthogonal axis to the first axis. In various embodiments, the primary planar waveguide 1 can be configured to expand the light's effective exit pupil along the second axis (e.g., X-axis) and/or expand the eyebox from within which a viewer can view the optical display system. For example, the distribution planar waveguide 3 can relay and expand light along the vertical or Y-axis, and pass that light to the primary planar waveguide 1 which relays and expands light along the horizontal or X-axis.

The optical system may include one or more sources of colored light (e.g., red, green, and blue laser light) 110 which may be optically coupled into a proximal end of a single mode optical fiber 9. A distal end of the optical fiber 9 may be threaded or received through a hollow tube 8 of piezoelectric material. The distal end protrudes from the tube 8 as fixed-free flexible cantilever 7. The piezoelectric tube 8 can be associated with 4 quadrant electrodes (not illustrated). The electrodes may, for example, be plated on the outside, outer surface or outer periphery or diameter of the tube 8. A core electrode (not illustrated) is also located in a core, center, inner periphery or inner diameter of the tube 8.

Drive electronics 12, for example electrically coupled via wires 10, drive opposing pairs of electrodes to bend the piezoelectric tube 8 in two axes independently. The protruding distal tip of the optical fiber 7 has mechanical modes of resonance. The frequencies of resonance can depend upon a diameter, length, and material properties of the optical fiber 7. By vibrating the piezoelectric tube 8 near a first mode of mechanical resonance of the fiber cantilever 7, the fiber cantilever 7 is caused to vibrate, and can sweep through large deflections.

By stimulating resonant vibration in two axes, the tip of the fiber cantilever 7 is scanned biaxially in an area filling two dimensional (2D) scan. By modulating an intensity of light source(s) 11 in synchrony with the scan of the fiber cantilever 7, light emerging from the fiber cantilever 7 forms an image. Descriptions of such a set up are provided in U.S. Patent Publication No. 2014/0003762, which is incorporated by reference herein in its entirety.

A component 6 of an optical coupler subsystem collimates the light emerging from the scanning fiber cantilever 7. The collimated light is reflected by mirrored surface 5 into the narrow distribution planar waveguide 3 which contains the at least one diffractive optical element (DOE) 4. The collimated light propagates vertically (relative to the view of FIG. 6) along the distribution planar waveguide 3 by total internal reflection, and in doing so repeatedly intersects with the DOE 4. The DOE 4 preferably has a low diffraction efficiency. This causes a fraction (e.g., 10%) of the light to be diffracted toward an edge of the larger primary planar waveguide 1 at each point of intersection with the DOE 4, and a fraction of the light to continue on its original trajectory down the length of the distribution planar waveguide 3 via TIR.

At each point of intersection with the DOE 4, additional light is diffracted toward the entrance of the primary waveguide 1. By dividing the incoming light into multiple outcoupled sets, the exit pupil of the light can be expanded vertically by the DOE 4 in the distribution planar waveguide 3 and/or the eyebox can be expanded. This vertically expanded light coupled out of distribution planar waveguide 3 enters the edge of the primary planar waveguide 1.

Light entering primary waveguide 1 propagates horizontally (relative to the view of FIG. 6) along the primary waveguide 1 via TIR. As the light intersects with DOE 2 at multiple points as it propagates horizontally along at least a portion of the length of the primary waveguide 1 via TIR. The DOE 2 may advantageously be designed or configured to have a phase profile that is a summation of a linear diffraction pattern and a radially symmetric diffractive pattern, to produce both deflection and focusing of the light. The DOE 2 may advantageously have a low diffraction efficiency (e.g., 10%), so that only a portion of the light of the beam is deflected toward the eye of the viewer with each intersection of the DOE 2 while the rest of the light continues to propagate through the waveguide 1 via TIR.

At each point of intersection between the propagating light and the DOE 2, a fraction of the light is diffracted toward the an exit surface of the primary waveguide 1 allowing the light to escape the TIR, and emerge from the exit surface of the primary waveguide 1. In some embodiments, the radially symmetric diffraction pattern of the DOE 2 additionally imparts a divergence to the diffracted light such that it appears to originate from a focal depth thereby shaping the light wavefront (e.g., imparting a curvature) of the individual beam as well as steering the beam at an angle that matches the designed focal depth.

Accordingly, these different pathways can cause the light to be coupled out of the primary planar waveguide 1 by a multiplicity of DOEs 2 at different angles, focal depths, and/or yielding different fill patterns at the exit pupil. Different fill patterns at the exit pupil can be beneficially used to create a light field display with multiple depth planes. Each layer in the waveguide assembly or a set of layers (e.g., 3 layers) in the stack may be employed to generate a respective color (e.g., red, blue, green). Thus, for example, a first set of three layers may be employed to respectively produce red, blue and green light at a first focal depth. A second set of three layers may be employed to respectively produce red, blue and green light at a second focal depth. Multiple sets may be employed to generate a full 3D or 4D color image light field with various focal depths.

Other Components of AR Systems

In many implementations, the AR system may include other components in addition to the wearable display system 80 (or optical systems 100). The AR devices may, for example, include one or more haptic devices or components. The haptic device(s) or component(s) may be operable to provide a tactile sensation to a user. For example, the haptic device(s) or component(s) may provide a tactile sensation of pressure and/or texture when touching virtual content (e.g., virtual objects, virtual tools, other virtual constructs). The tactile sensation may replicate a feel of a physical object which a virtual object represents, or may replicate a feel of an imagined object or character (e.g., a dragon) which the virtual content represents. In some implementations, haptic devices or components may be worn by the user (e.g., a user wearable glove). In some implementations, haptic devices or components may be held by the user.

The AR system may, for example, include one or more physical objects which are manipulable by the user to allow input or interaction with the AR system. These physical objects are referred to herein as totems. Some totems may take the form of inanimate objects, for example a piece of metal or plastic, a wall, a surface of table. Alternatively, some totems may take the form of animate objects, for example a hand of the user. As described herein, the totems may not actually have any physical input structures (e.g., keys, triggers, joystick, trackball, rocker switch). Instead, the totem may simply provide a physical surface, and the AR system may render a user interface so as to appear to a user to be on one or more surfaces of the totem. For example, the AR system may render an image of a computer keyboard and trackpad to appear to reside on one or more surfaces of a totem. For instance, the AR system may render a virtual computer keyboard and virtual trackpad to appear on a surface of a thin rectangular plate of aluminum which serves as a totem. The rectangular plate does not itself have any physical keys or trackpad or sensors. However, the AR system may detect user manipulation or interaction or touches with the rectangular plate as selections or inputs made via the virtual keyboard and/or virtual trackpad.

Examples of haptic devices and totems usable with the AR devices, HMD, and display systems of the present disclosure are described in U.S. Patent Publication No. 2015/0016777, which is incorporated by reference herein in its entirety.

Optical Systems with Exit Pupil Expander

An optical system (e.g., wearable display system 80 or the optical system 100) comprising a waveguide (e.g., planar waveguide 1) that is configured to output incoupled light propagating through the waveguide via total internal reflection can be associated with an exit pupil configured such that light rays that exit the system through the exit pupil can be viewed by a user. An exit pupil larger than the pupil size of the user's eyes wastes some light, but allows for some tolerance in side-to-side movement of the user's head or eye. The optical system can also be associated with an eyebox which corresponds to the volume where the user can place his/her eye without sacrificing full field of view (FOV) and/or the full resolution of the optical system.

Various embodiments of optical systems (e.g., wearable display system 80 or the optical system 100) can include additional waveguides (e.g., the distribution waveguide apparatus 3 illustrated in FIG. 6) that are configured to increase the size of the light beam that exits the optical system. Increasing the size of the light beam that exits the optical system can advantageously expand the size of the exit pupil of the optical system. Expanding the size of the exit pupil can be useful when the optical system is configured to be directly viewed by a user and/or in near-to-eye display applications. Expanding the size of the exit pupil can also be advantageous in alleviating the strain on eye when viewing the optical system.

Figure 7:
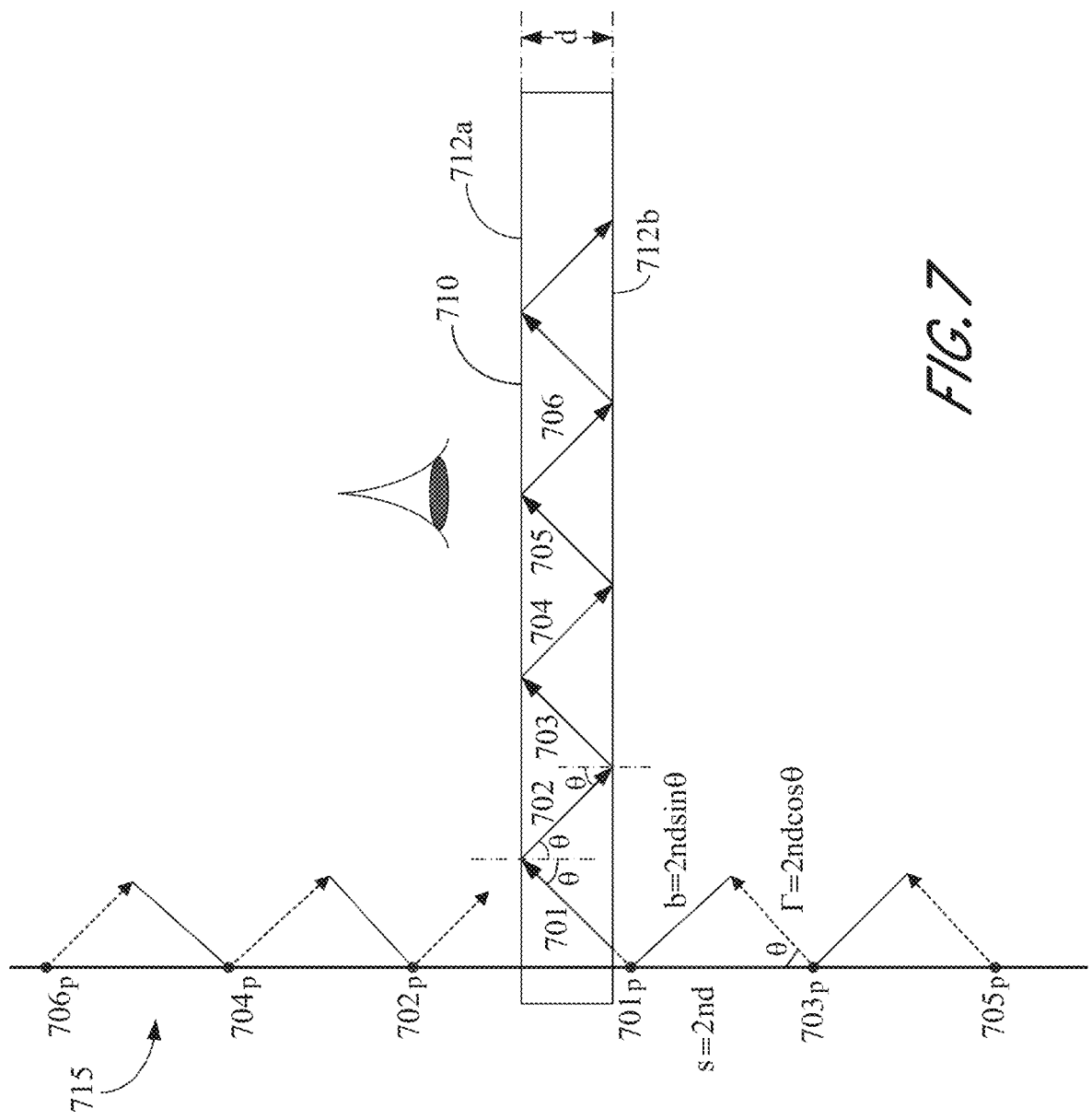
FIG. 7 illustrates a waveguide receiving an input light beam being incident on the waveguide at an angle θ and propagating through the waveguide by multiple total internal reflections.

Various embodiments of an optical system (e.g., wearable display system 80 or the optical system 100) can comprise a waveguide (e.g., planar waveguide 1) having two reflective surfaces—a first reflective surface and a second reflective surface. An incoming light beam incident on the first reflective surface at an angle θ can be coupled into the waveguide such that it propagates through the waveguide via total internal reflection at the first and the second reflective surfaces. Each occurrence of total internal reflection at the first and the second reflective surface can be considered to produce a copy of the incoming light beam. Accordingly, multiple copies of the incoming light beam can be produced as the light beam propagates through the waveguide. Incoming light beam that propagates through the waveguide can be outcoupled out of the waveguide through the second reflective surface. Each copy of the incoupled light beam can be considered to be a kaleidoscopic copy or a mirror image of the incoupled light beam. Accordingly, the light that is coupled out of the second reflective surface of the waveguide can be considered to include a beamlet array including a plurality of light beams that are copies of the incoupled light beam. Each of the plurality of light beams can have a beam diameter that is equal to the beam diameter of the incoupled light beam. Each of the plurality of light beams of the beamlet array can appear to originate from a virtual source that is disposed on a side of the reflective surface from which the incoupled light beam is total internally reflected. Accordingly, each reflective surface of the waveguide produces a set of mirror image copies of the input light source that emits the incoming light beam. The set of mirror image copies appear to be on a side of a respective reflective surface. This is explained further below with reference to FIG. 7 which illustrates an incoupled light beam 701 being incident on a first reflective surface 712b of a waveguide 710 at an angle θ and propagating through the waveguide 710 by multiple total internal reflections at the first reflective surface 712b and a second reflective surface 712a opposite the first reflective surface 712b of the waveguide 710. Reflected light beams 702, 703, 704, 705 and 706 are reflected from the surface 712a and/or 712b at an angle θ with respect to a normal to surface 712a and/or 712b. As discussed above, each reflected beam 702, 703, 704, 705 and 706 can be considered to be a copy of the incoupled light beam 701. A portion of each reflected beam 702, 703, 704, 705 and 706 can exit the waveguide 710 through the second reflective surface 712a to form a beamlet array including a plurality of light beams, each light beam in the plurality being a copy of the incoupled light beam. For example, each light beam in the plurality of light beams can comprise the same image information. In various embodiments, the portion of each reflected beam 702, 703, 704, 705 and 706 in the beamlet array can have a size that is equal to the size of the incoupled light beam 701. FIG. 7 illustrates a simplified one dimensional version of the two dimensional beamlet array that is produced by the optical system (e.g., wearable display system 80 or the optical system 100) comprising a waveguide (e.g., planar waveguide 1). This two dimensional beamlet array may for example extend along the plane of the first/second reflective surface of the waveguide (e.g., planar waveguide 1).

A pivotable optical system, such as, for example, a human eye viewing one of the two surfaces of the waveguide 710 (e.g., second reflective surface 712a as illustrated in FIG. 7) can receive the portion of one or more of the reflected beams 702, 703, 704, 705 and 706 that exit the waveguide 710. In some such embodiments, the pivotable optical system can perceive (i) the incoupled light beam 701 and other reflected beams that propagate in a direction parallel to the incoupled beam 701 (e.g., reflected beams 703 and 705) towards the surface 712a as being emitted from sources (e.g., 701p, 703p, 705p) located on a plane 715 perpendicular to the waveguide 710; and (ii) the reflected beams that propagate in a direction parallel to the reflected beam 702 (e.g., reflected beams 704 and 706) towards the surface 712b as being emitted from sources (e.g., 702p, 704p, 706p) located on the plane 715. The multiple sources 701p, 702p, 703p, 704p, 705p and 706p are mirror copies of the input source from which the incoupled light beam is emitted. As illustrated in FIG. 7, sources 701p, 703p, and 705p can be perceived as being located below the waveguide 710 and sources 702p, 704p, and 706p can be perceived as being located above the waveguide 710. The sources 701p, 703p, and 705p can be equidistant from each other. The sources 702p, 704p, and 706p can also be equidistant from each other. If the input light source is coherent, the optical wavefronts that are produced by the plurality of mirrored sources 701p, 702p, 703p, 704p, 705p and 706p can interact with one another to produce an angularly selective interference pattern that can be analogous to the interference pattern produced by Fabry-Perot etalons, Bragg diffraction gratings, and thin film optics. The distance, s, between consecutive point sources 701p, 703p, and 705p (or 702p, 704p, and 706p) can be equal to twice the product of the thickness 'd' of the waveguide which corresponds to the distance between the surfaces 712a and 712b and the refractive index 'n' of the waveguide 710. Accordingly, the distance, s, between consecutive point sources 701p, 703p, and 705p (or 702p, 704p, and 706p) can be calculated using the equation s=2nd. As depicted in FIG. 7, the distance, b, between two adjacent light beams in the beamlet array (also referred to herein as inter-beamlet spacing) that propagate along the same direction and are produced by the plurality of virtual sources 701p, 703p, and 705p (or 702p, 704p, and 706p) is given by the equation b=2nd sin θ, where the angle θ is the angle of incidence of the incoupled light beam. Without any loss of generality, light from the input light source can be coupled into the waveguide 710 through one of the reflective surfaces 712a or 712b or through one of the edges between the reflective surfaces 712a or 712b. In various embodiments, where the incoupled light beam is introduced into the waveguide 710 by a projector (e.g., a projection system including a fiber cantilever 7 illustrated in FIG. 6), the angle θ can be the scan angle. The optical path length, Γ, between adjacent light beams of the beamlet array is given by the equation Γ=2nd cos θ.

Figure 1:
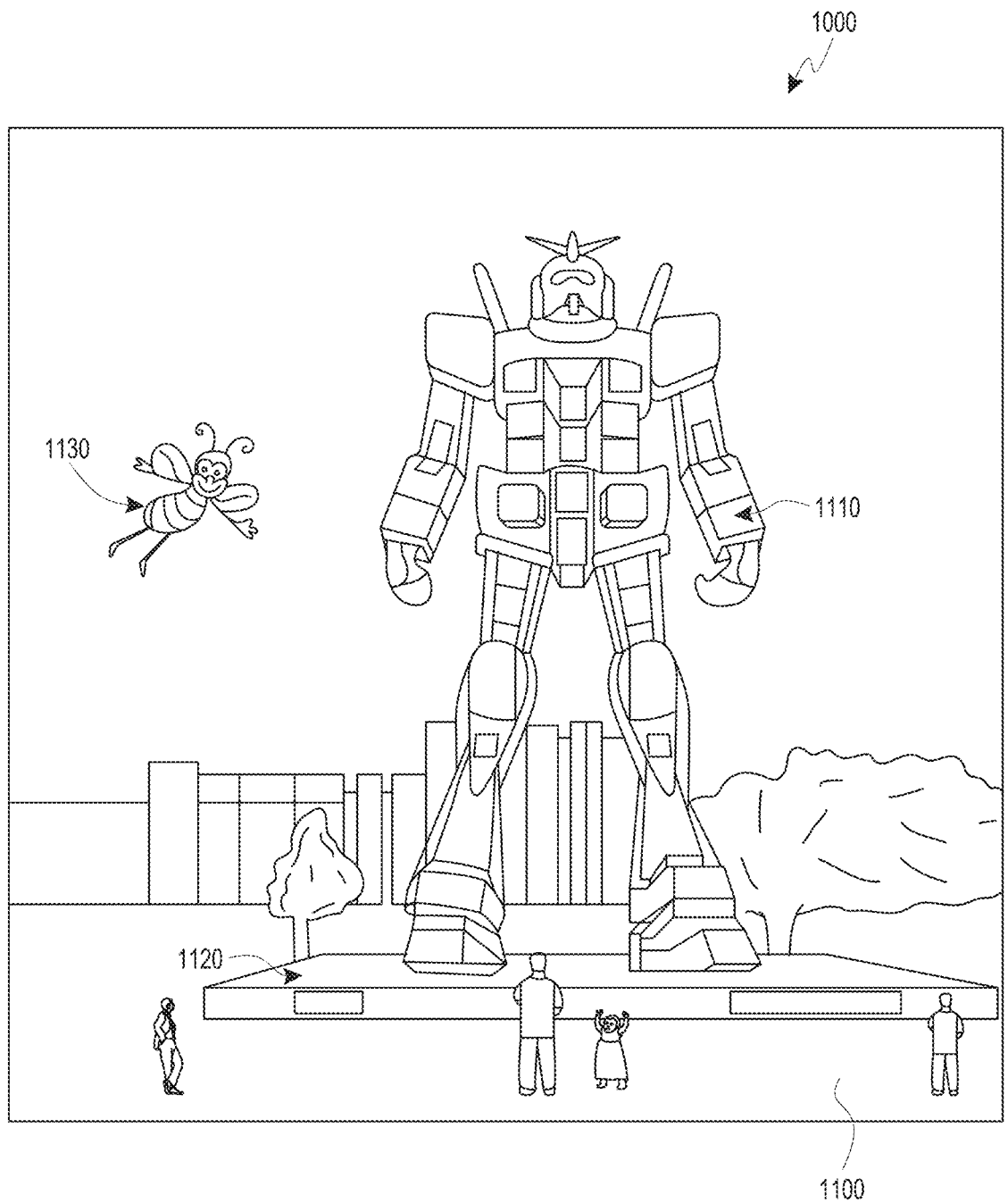
FIG. 1 depicts an illustration of an augmented reality scenario with certain virtual reality objects, and certain actual reality objects viewed by a person.

The point spread function (PSF) of the beamlet array output from the waveguide can depend on the characteristics of the input light source that outputs the incoupled light beam 701. This is explained herein with reference to FIGS. 8A-1, 8A-2, 8A-3, 8B-1, 8B-2 and 8B-3. FIG. 8A-1 illustrates an embodiment of a waveguide 710 that is configured to receive light output from an incoherent input light source, such as, for example a LCOS projector. The incoherent input light source that illuminates the embodiment of the waveguide 710 outputs an incoherent beam of light having a beam diameter, 'a'. The beamlet array that exits the waveguide 710 includes light beams 801a, 801b and 801c. Since, the input light source is incoherent, the light beams 801a, 801b and 801c are mutually incoherent with respect to each other such that a phase relationship between the light beams 801a, 801b and 801c exiting the waveguide cannot be determined. Additionally, for the embodiment illustrated in FIG. 8A-1, the inter-beamlet spacing b between two adjacent light beams (e.g., between 801a and 801b or between 801b and beam 801c) is greater than the beam diameter of each light beam in the output beamlet array which is substantially the same as the beam diameter 'a', of the input light beam. FIG. 8B-1 illustrates the diffractive pattern 805a of an individual beam of the beamlet array output from the embodiment of waveguide 710 illustrated in FIG. 8A-1 that receives light from an incoherent input light source. The diffractive pattern 805a illustrated in FIG. 8B-1 has a central peak and two sidelobes. Each sidelobe also includes a peak. The width $\theta_a$, between the maxima of the first sidelobes of the diffractive pattern 805a, can provide a measure of aperture size of the optical system including the waveguide 710 driven by the incoherent light source, is proportional to the ratio $\lambda/a$, where $\lambda$ is the wavelength of the incoming light and 'a' is the beam diameter. The point spread function (PSF) for the beamlet array output from the embodiment of waveguide 710 which receives light from an incoherent input light source as illustrated in FIG. 8A-1 is equal to the width $\theta_a$ of the diffractive pattern 805a and is equivalent to a wide diffraction envelope that is produced by a single beam having a beam diameter equal to 'a'. The PSF represents the image that an optical system forms of a point source. The PSF of a perfect optical system is an Airy pattern which is made up of a central spot or peak or a bright region surrounded by concentric rings of diminishing intensity. The space between the central spot and successive concentric rings has reduced intensity. At large distance from an aperture or pupil having a size d, the angle $\theta$ between an axis intersecting the center of the central spot and the region of reduced intensity between the central spot and the first concentric ring is given by the equation $\sin \theta = 1.22\lambda/d$, where $\lambda$ is the wavelength of light. Accordingly, as the size of the central spot gets smaller, the pupil size gets larger. Thus, the Airy pattern (or the PSF) can provide a measure of the pupil size of an optical system. Without subscribing to any theory a system with a larger pupil size has a narrower PSF.

FIG. 8A-2 illustrates an embodiment of a waveguide 710 that is configured to receive light output from a coherent input light source. The coherent input light source that illuminates the embodiment of the waveguide 710 outputs a coherent beam of light having a beam diameter, a. The beamlet array that exits the waveguide 710 includes light beams 802a, 802b and 802c. Since, the input light source is coherent, the light beams 802a, 802b and 802c are mutually coherent with respect to each other such that a phase relationship between the light beams 802a, 802b and 802c exiting the waveguide is deterministic. Additionally, for the embodiment illustrated in FIG. 8A-2, the inter-beamlet spacing b between two adjacent light beams (e.g., between 802a and 802b or between 802b and beam 802c) is greater than the beam diameter of each light beam in the output beamlet array which is substantially the same as the beam diameter 'a', of the input light beam. FIG. 8B-2 illustrates the interference pattern 805b produced by optical interference between the coherent light beams 802a, 802b and 802c. The interference pattern 805b illustrated in FIG. 8B-2 has a central peak and four sidelobes. Each sidelobe also includes a peak. The width Ob, between the maxima of the first sidelobes of the interference pattern 805b is proportional to the ratio $\lambda/b$, where $\lambda$ is the wavelength of the incoming light and b is the inter-beamlet spacing. The point spread function (PSF) for the beamlet array output from the embodiment of waveguide 710 illustrated in FIG. 8A-2 that receives light from a coherent input light source is a product of the interference pattern and the diffractive envelope of an individual beam of the array which is depicted by the pattern 805a. Accordingly, the PSF for the beamlet array output from the embodiment of waveguide 710 illustrated in FIG. 8A-2 that receives light from a coherent input light source corresponds to a diffraction envelope that is produced by a single beam having a beam diameter equal to 'a' angularly filtered by the interference pattern produced by the mutual interactions between the coherent beams of the beamlet array. The spacing between the filter points of the interference pattern produced by the mutual interactions between the coherent beams of the beamlet array is directly proportional to the optical wavelength $\lambda$ of the beams and inversely proportional to the inter-beamlet spacing, b. The aperture size for the beamlet array output from the embodiment of waveguide 710 illustrated in FIG. 8A-2 that receives light from a coherent input light source can be greater than the aperture size of the optical system including the waveguide 710 driven by an incoherent input light source.

FIG. 8A-3 illustrates an embodiment of a waveguide 710 that is configured to receive light output from a coherent input light source. The coherent input light source that illuminates the embodiment of the waveguide 710 outputs a coherent beam of light having a beam diameter, a. The beamlet array that exits the waveguide 710 is a composite beam that includes light beams 803a, 803b and 803c. Since, the input light source is coherent, the light beams 803a, 803b and 803c are mutually coherent with each other such that a phase relationship between the light beams 803a, 803b and 803c exiting the waveguide is deterministic. Additionally, for the embodiment illustrated in FIG. 8A-3, the inter-beamlet spacing b between two adjacent light beams (e.g., between 803a and 803b or between 803b and beam 803c) is adjusted such that is it approximately equal to the beam diameter of each light beam in the output beamlet array which is substantially the same as the beam diameter 'a', of the input light beam and the optical path length difference $\Gamma = 2nd \cos \theta$ is an integral multiple of the wavelength $\lambda$. For this embodiment of the waveguide 710 driven by a coherent light source wherein the angle of incidence and the thickness and refractive index of the waveguide 710 is an integral multiple of the wavelength $\lambda$, the various coherent beams of the beamlet array merge to form a continuous wavefront with a uniform phase. The corresponding PSF which is obtained by the product of the interference pattern 805c illustrated in FIG. 8B-3 and the diffractive envelop of an individual beam illustrated by the curve 805a is equivalent to the narrower diffraction envelope that is produced by a single beam with diameter 'A' which is equal to the product of the number of beamlets in the composite beam and beam diameter 'a' of the each individual beam in the beamlet array.

FIG. 8C illustrates a light beam 810 with a continuous wavefront 815 having a uniform phase that is output from the embodiment of waveguide 710 which receives light from a coherent input light source wherein the optical path length difference $\Gamma=2nd\cos\theta$ is an integral multiple of the wavelength $\lambda$. As discussed above, the beam diameter, 'A' of the light beam 810 is greater than the beam diameter, 'a' of the input light beam. In optical systems in which light from a coherent input light source is incident at an angle $\theta$ on a waveguide having a refractive index 'n' and thickness 'd' such that the optical path length difference $\Gamma=2nd\cos\theta$ is an integral multiple of the wavelength $\lambda$ of the incident light, the waveguide can be configured to function as an exit pupil expander (EPE). An optical system in which the optical path length difference $\Gamma=2nd\cos\theta$ is not an integral multiple of the wavelength $\lambda$ of the incident light need not necessarily expand the exit pupil of the system but can instead expand the eyebox of the system. Expanding the eyebox can advantageously increase the tolerance of the system (e.g., wearable display system 80 or the optical system 100) to side-to-side movement of the user's head or eye.

In embodiments of optical systems (e.g., optical system 100) in which light from a scanning projector (e.g., a projection system including a fiber cantilever 7 illustrated in FIG. 6) is incoupled into a lightguide (e.g., planar waveguide 1), the aperture size of the projector can be small. For example, the output aperture size of the projector can be greater than or equal to 25 microns and less than or equal to 50 microns, greater than or equal to 35 microns and less than or equal to 75 microns, greater than or equal to 50 microns and less than or equal to 100 microns, or values therebetween. Various embodiments of such optical systems can employ complex lens based optical systems to expand the input aperture, which corresponds to the aperture size of the projector. For example, the optical systems employed to expand the exit pupil may be configured to achieve an output aperture that is greater than or equal to about 200 microns and less than or equal to about 1 mm, greater than or equal to about 250 microns and less than or equal to about 950 microns, greater than or equal to about 300 microns and less than or equal to about 900 microns, greater than or equal to about 350 microns and less than or equal to about 850 microns, greater than or equal to about 400 microns and less than or equal to about 800 microns, greater than or equal to about 450 microns and less than or equal to about 750 microns, greater than or equal to about 500 microns and less than or equal to about 700 microns, greater than or equal to about 550 microns and less than or equal to about 650 microns, greater than or equal to about 600 microns and less than or equal to about 650 microns, or values therebetween.

Although, lens based exit pupil expander systems can achieve a desired output aperture size, they can be bulky and heavy making them unpractical to be integrated with near-to-eye display systems. As discussed above waveguides having a refractive index 'n' and thickness 'd' can function as an EPE when the optical path length difference between adjacent beams of the beamlet array output from the waveguide, $\Gamma=2nd\cos\theta$ is an integral multiple of the wavelength $\lambda$ of incident light can expand the exit pupil. Accordingly, waveguides can provide a compact way of increasing the exit pupil of an optical system without contributing to the weight or bulk.

However, as noted for FIGS. 8A-1 through 8C, optical systems including waveguides can function as an exit pupil expander only when the incident angle at which input light is incoupled into the waveguide, the refractive index 'n' and thickness 'd' of the waveguide are configured such that the optical path length difference between adjacent beams of the beamlet array output from the waveguide, $\Gamma=2nd\cos\theta$ is an integral multiple of the wavelength $\lambda$. Light from a scanning projector (e.g., a light source including a fiber cantilever 7 illustrated in FIG. 6) is incident on an optical system that employs a waveguide as an exit pupil expander, the incident angle $\theta$ at which input light is incoupled into the waveguide varies with the scan angle of the scanning projector which sweeps out a solid angle $\Theta$ corresponding to the field of view (FOV) of the optical system. For example, the input angle $\theta$ can vary within a solid angle $\Theta$ between about 30 degrees to about 50 degrees. If the scanning projector comprises a fiber (e.g., a light source including a fiber cantilever 7 illustrated in FIG. 6), then the frequency at which the input angle $\theta$ varies can be equal to the frequency at which the fiber revolves. In various embodiments of a scanning projector comprising a fiber, the fiber can make 11000-30000 revolutions/second. Thus, the input angle $\theta$ in such embodiments can vary at a frequency between about 0.1 MHz to about 10 MHz.

As the incident angle at which input light is incoupled into the waveguide varies within the solid angle $\Theta$, the beamlet array output from the waveguide is angularly filtered by a discrete two-dimensional (2D) grid of focused spots, as described above with reference to FIGS. 8A-2 and 8B-2. The focused spots can correspond to the set of angles that meet the phase synchronization condition—the optical path length difference between adjacent beams being an integral multiple of the light's wavelength. The angular filtration of the beamlet array by the discrete two-dimensional (2D) grid of focused spots can produce interference maxima, which correspond to bright, tightly focused pixels, and interference minima, which correspond to dim or blank pixels as the angle of incidence varies within the solid angle $\Theta$ if the optical and mechanical properties of the waveguide (e.g., refractive index 'n' and the thickness 'd') does not vary correspondingly such that the optical path length difference between adjacent beams of the beamelet array is an integral multiple of the wavelength of the light. Thus, the intensity of the beamlet array output from the waveguide can vary intermittently as the angle of incidence varies within the solid angle $\Theta$ between a maximum brightness and a minimum brightness if the optical and mechanical properties of the waveguide (e.g., refractive index 'n' and the thickness 'd') does not vary correspondingly such that the optical path length difference between adjacent beams of the beamelet array is an integral multiple of the wavelength of the light. Accordingly, images projected through embodiments of an optical system in which the angle of incidence varies but the mechanical properties of the waveguide and/or the wavelength of the incident light remains the same such that the optical path length difference between adjacent beams of the beamelet array is not an integral multiple of the wavelength of the light for all incident angles can appear as if the images have been sieved by a black mesh.

In optical systems including a scanning projector with a small aperture size as a source of optical signal and a waveguide as an exit pupil expander, it is advantageous to control one or more of the optical and/or mechanical properties of the display system and/or the input beam to maintain the intensity of projected images at an intensity level above a threshold. The optical and/or mechanical properties can include the spacing between the reflective surfaces of the waveguide (also referred to as the thickness 'd'), the index of refraction 'n' of the waveguide or the wavelength λ of the input optical signal. The optical and/or mechanical properties of the display system and/or the input beam can be controlled to be in synchrony with the variations of the input beam's scan angle such that the discrete two-dimensional (2D) grid of focused spots can be angularly shifted in a manner such that every scan angle of the projector will produce a beamlet array that has a compact tightly focused PSF (similar to the PSF depicted in FIG. 8B-3).

The output beam produced by an optical system comprising a waveguide that splits a scanned input beam into a regular two-dimensional beamlet array including a plurality of light beams can have a beam diameter that is greater than the beam diameter of individual ones of the plurality of light beams of the beamlet array when one or more of the physical or optical properties of the waveguide and/or the wavelength of the scanned input beam is varied approximately at a frequency of the scan rate. By varying one or more of the physical or optical properties of the waveguide and/or the wavelength of the scanned input beam at a frequency of the scan rate can advantageously control the relative phase shift between the light beams in the beamlet array such that the output beam has a continuous wavefront with a uniform phase. Such embodiments of the optical system can be considered to function as an optical phase array that is capable of forming and steering output beams with larger beam diameters. In such optical systems, the projector's scanning technology can steer the input beam between the preferred angles of the waveguide's angular filter grid (which corresponds to the 2D grid of focused spots), and the modulation technologies employed to vary one or more of the physical or optical properties of the waveguide and/or the wavelength of the scanned input beam at the frequency of the scan rate are responsible for steering the angular filter grid between the different angles of the input beam. In various embodiments, the waveguide can be configured such that the beamlet array output from the waveguide forms a light beam having a continuous wavefront with a uniform phase and a beam diameter that is larger than the beam diameter of the individual beams in the beamlet array without dynamically varying (e.g., by utilizing one or more holographic structures) one or more of the physical or optical properties of the waveguide and/or the wavelength of the scanned input beam at a frequency of the scan rate. Systems and methods that can dynamically or non-dynamically achieve phase synchronization between the various light beams of the beamlet array for different scanned angles of the input light beam are discussed below.

1. Dynamic Phase Synchronization

A variety of techniques and methods can be used to vary one or more of the physical or optical properties of the waveguide and/or the wavelength of the scanned input beam at a frequency of the scan rate to dynamically achieve phase synchronization between the various light beams of the beamlet array for different scanned angles of the input light beam which are discussed below. In various embodiments, the optical system can comprise a control system that is configured to control one or more of the physical or optical properties of the waveguide (e.g., refractive index, distance between the reflective surfaces of the waveguide) and/or the wavelength of the input beam. The control system can include feedback loops to continuously maintain phase synchronization between the individual light beams of the beamlet array.

1.1. Index of Refraction

Figure 9A:
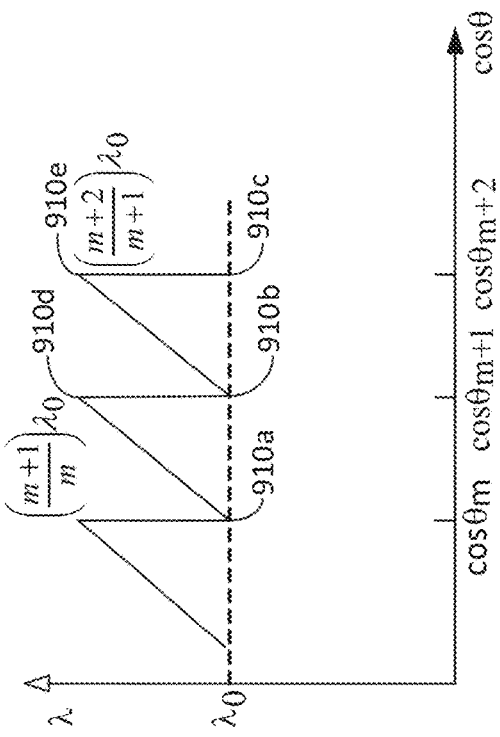
FIG. 9A schematically illustrates a graph that shows the variation of refractive index 'n' of the waveguide versus cosine of the input angle.

As discussed above, to maintain phase synchronization between the individual light beams of the beamlet array the optical path length difference $\Gamma = 2nd \cos \theta$ should be an integral multiple of the wavelength λ. Accordingly, if the index of refraction of the material of the waveguide is varied at a frequency of the scan rate (or at the frequency at which θ varies) such that the optical path length difference $\Gamma = 2nd \cos \theta$ is an integral multiple of the wavelength λ for all input angles θ, then phase synchronization between the individual light beams of the beamlet array can be maintained for all input angles θ. FIG. 9A schematically illustrates a graph which shows the variation of refractive index 'n' of the waveguide versus cosine of the scan angle θ. The points 901a, 901b and 901c of FIG. 9A refer to the refractive index value no at scan angles $\theta_m$, $\theta_{m+1}$ and $\theta_{m+2}$ at which the terms $2n_0 d \cos \theta_m$, $2n_0 d \cos \theta_{m+1}$ and $2n_0 d \cos \theta_{m+2}$ are equal to mλ, (m+1)λ and (m+2)λ respectively, wherein m is an integer. The point 901d of FIG. 9A has a refractive index value of $$\left(\frac{m}{m+1}\right)$$

$n_0$ at scan angle $\theta_{m+1}$ such that the term $$2\left(\frac{m}{m+1}\right)$$

$n_0 d \cos \theta_{m+1}$ is equal to mλ, wherein m is an integer. The point 901e of FIG. 9A has a refractive index value of $$\left(\frac{m+1}{m+2}\right)$$

$n_0$ at scan angle $\theta_{m+2}$ such that the term $$2\left(\frac{m+1}{m+2}\right)$$

$n_0 d \cos \theta_{m+2}$ is equal to (m+1)λ, wherein m is an integer. In FIG. 9A, m is considered to have a large value such that $$\left(\frac{m}{m+1}\right)$$

$n_0$ is substantially equal to $$\left(\frac{m+1}{m+2}\right)$$

$n_0$. Only some of the possible values of refractive index 'n' at which 2nd cos θ is an integral multiple of the wavelength λ are depicted in FIG. 9A. Other values of refractive index 'n' at which 2nd cos θ is an integral multiple of the wavelength λ are possible. For scan angles between scan angles $\theta_m$ and $\theta_{m+1}$ (or $\theta_{m+1}$ and $\theta_{m+2}$) the value of the refractive index can be changed such that 2nd cos θ remains an integral multiple of the wavelength λ. For small changes in the value of the refractive index 'n', the variation of refractive index 'n' between scan angles $\theta_m$ and $\theta_{m+1}$ (or $\theta_{m+1}$ and $\theta_{m+2}$) can be linear as depicted in FIG. 9A. In various embodiments, the refractive index can be varied by an amount $\Delta n$ that is less than or equal to about 25% of a base refractive index. The base refractive index can correspond to the refractive index value no discussed above. For example, the refractive index can be varied by an amount $\Delta n$ that is less than or equal to about 10%, less than or equal to about 15%, less than or equal to about 20% of the base refractive index. As discussed above, the variation of the refractive index can be synchronized with the variation in the scan angle $\theta$. As another example, the refractive index can be varied by an amount $\Delta n$ between approximately 0.001 and about 0.01. The variation of the refractive index can be periodic as depicted in FIG. 9A.

Refractive index of the material of the waveguide can be varied by a variety of techniques including but not limited to varying parameters of an electrical or optical field, varying temperature of the material of the waveguide, varying chemical compositions and/or concentrations of various materials comprised in the waveguide, by piezo-optic effects, etc. For example, the waveguide can comprise a crystalline and/or liquid crystal material whose index of refraction can be varied with the application of electric fields via a number of different electro-optic effects. As another example, the waveguide can comprise a liquid solution whose index of refraction can be varied by controlling the mixing and relative concentrations of its solutes. As another example, the waveguide can comprise a chemically active substrate whose index of refraction can be varied by controlling the rate and/or the results of chemical reactions within the material comprising the waveguide. For example, in some embodiments, the rate and/or the results of chemical reactions within the material comprising the waveguide can be controlled by application of electric field, application of optical field or both. As another example, in some embodiments, the rate and/or the results of chemical reactions within the material comprising the waveguide can be controlled by the use of chemical pumps. Changes in optical wavelength can also produce changes in the refractive index. Accordingly, in various embodiments, the change in the refractive index can be correlated to the wavelength $\lambda$ of light that is incident on the waveguide. For example, the wavelength $\lambda$ of the incident light can vary due to a variety of factors including but not limited to modulation of the incident light, non-linearity and/or dispersion of the waveguide. For example, in various embodiments, the wavelength of the incident light $\lambda$ can change by an amount $\Delta\lambda$ that is about 1%-10% of the wavelength $\lambda_{optical}$ of the unmodulated incident light due to modulation. Accordingly, a controller configured to vary the refractive index of the material of the light can be configured to take into consideration the change in the wavelength $\lambda$ of the incident light when calculating the amount $\Delta n$ by which refractive index is to be changed. In various embodiments, the controller can include a feedback loop that is configured to dynamically calculate a change in the wavelength $\lambda$ of the incident light and calculate the amount $\Delta n$ by which refractive index is to be changed based on the change in the wavelength $\lambda$ of the incident light such that phase synchronization between the various light beams of the beamlet array for different scanned angles of the input light beam can be achieved.

1.2. Reflector Plane Spacing

Figures 1, 9B:
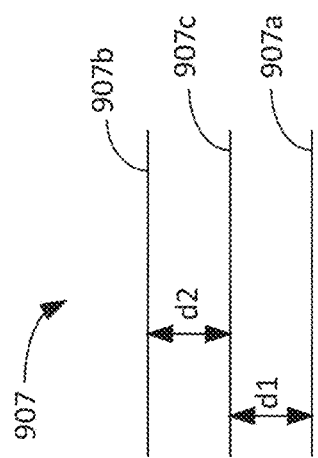
FIG. 9B schematically illustrates a graph that shows the variation of the spacing between the reflective surfaces 'd' of the waveguide versus cosine of the input angle.
Figure 9B:
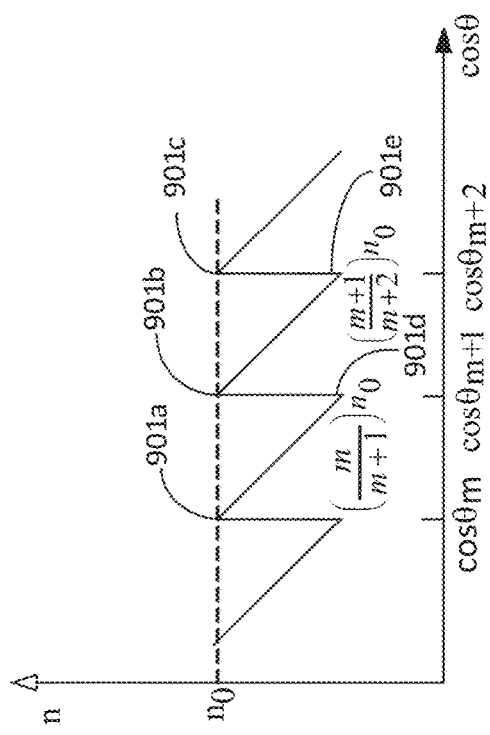

Various embodiments of the waveguide can be configured such that the space (also referred to as thickness of the waveguide) between the reflective surfaces (e.g., reflective surfaces 712a and 712b of waveguide 710) need not be fixed but instead can be varied. For example, in various embodiments of the waveguide, the space between the reflective surfaces (e.g., reflective surfaces 712a and 712b of waveguide 710) can be occupied by a fluid or air. The waveguide can comprise a controller that moves one or both the reflective surfaces with respect to each other to vary a distance between the reflective surfaces and/or a thickness of the space including the fluid or air at a frequency of the scan rate (or at the frequency at which $\theta$ varies) such that the optical path length difference $\Gamma = 2nd \cos\theta$ is an integral multiple of the wavelength $\lambda$ for all input angles $\theta$. FIG. 9B schematically illustrates a graph which shows the variation of the spacing between the reflective surfaces 'd' of the waveguide versus cosine of the scan angle $\theta$. The points 905a, 905b and 905c of FIG. 9B refer to the value of the spacing between the reflective surfaces of the waveguide $d_0$ at scan angles $\theta_m$, $\theta_{m+1}$ and $\theta_{m+2}$ at which the terms $2nd_0 \cos\theta_m$, $2nd_0 \cos\theta_{m+1}$ and $2nd_0 \cos\theta_{m+2}$ are equal to $m\lambda$, $(m+1)\lambda$ and $(m+2)\lambda$ respectively, wherein m is an integer. The spacing between the reflective surfaces of the waveguide at point 905d of FIG. 9B is $$\left(\frac{m}{m+1}\right)$$

$d_0$ at scan angle $\theta_{m+1}$ such that the term $$2\left(\frac{m}{m+1}\right)$$

$nd_0 \cos\theta_{m+1}$ is equal to $m\lambda$, wherein m is an integer. The spacing between the reflective surfaces of the waveguide at point 905e of FIG. 9B is $$\left(\frac{m+1}{m+2}\right)$$

$d_0$ at scan angle $\theta_{m+2}$ such that the term $$2\left(\frac{m+1}{m+2}\right)$$

$nd_0 \cos\theta_{m+2}$ is equal to $(m+1)\lambda$, wherein m is an integer. In FIG. 9B, m is considered to have a large value such that $$\left(\frac{m+1}{m+2}\right)$$

$d_0$ is substantially equal to $$\left(\frac{m}{m+1}\right)$$

$d_0$. Only some of the possible values of the spacing 'd' between the reflective surfaces of the waveguide at which $2nd \cos\theta$ is an integral multiple of the wavelength $\lambda$ are depicted in FIG. 9B. Other values of the spacing 'd' between the reflective surfaces of the waveguide at which $2nd \cos\theta$ is an integral multiple of the wavelength λ are possible. For scan angles between scan angles $\theta_m$ and $\theta_{m+1}$ (or $\theta_{m+1}$ and $\theta_{m+2}$) the value of the spacing 'd' between the reflective surfaces of the waveguide can be changed such that 2nd cos θ remains an integral multiple of the wavelength λ. For small changes in the value of the spacing 'd' between the reflective surfaces of the waveguide, the variation of the spacing 'd' between the reflective surfaces of the waveguide between scan angles $\theta_m$ and $\theta_{m+1}$ (or $\theta_{m+1}$ and $\theta_{m+2}$) can be linear as depicted in FIG. 9B. The spacing 'd' between the reflective surfaces of the waveguide can be varied by an amount Δd that is less than or equal to about 25% of a base spacing between the reflective surfaces of the waveguide. For example, the spacing 'd' between the reflective surfaces of the waveguide can be varied by an amount Δd that is less than or equal to about 10%, less than or equal to about 15%, less than or equal to about 20% of the base spacing between the reflective surfaces of the waveguide. As another example, the spacing 'd' between the reflective surfaces of the waveguide can be varied by an amount Δd less than or equal to about 1 micron. In various embodiments, the base spacing between the reflective surfaces of the waveguide can correspond to the spacing do discussed above.

As discussed above, the variation of the spacing 'd' between the reflective surfaces of the waveguide can be synchronized with the variation in the scan angle θ. The variation of the spacing between the reflective surfaces of the waveguide can be periodic as depicted in FIG. 9B. The spacing between the reflective surfaces of the waveguide can be changed by a variety of techniques including but not limited to mechanical methods, electro-mechanical methods, acousto-optic methods, electro-magnetic methods, piezo-electric methods, etc. For example, the waveguide can be configured as a micro-electro mechanical systems (MEMS) device comprising a pair of reflective surfaces and a controller configured to control the distance between the reflective surfaces. As another example, the waveguide can comprise an acousto-optic material bounded by two surfaces. The two surfaces of the waveguide can be configured to be reflective by density variations in the acousto-optic material, that are induced by acoustic standing waves generated by an acoustic driver. In such embodiments, the spacing between the two surfaces can be varied by changing the frequency of the acoustic driver that generates the acoustic standing waves.

In another embodiment, the waveguide can comprise a plurality of layers that are spaced apart from each other. Each of the plurality of layers can be configured to be switched between a reflective state and a transmissive state. A pair of reflective surfaces with any desired spacing between them can be obtained by selectively configuring two of the plurality of layers to be in a reflective state and configuring the remaining plurality of layers to be in a transmissive state. In such embodiments, each of the plurality of layers can be switched between the reflective state and the transmissive state using electro-magnetic control systems. This is explained in greater detail below with reference to FIG. 9B-1 which depicts a waveguide 907 comprising three layers 907a, 907b and 907c. The third layer 907c is disposed between the first layer 907a and the second layer 907b. The first layer 907a can be maintained in a reflective state. By configuring the second layer 907b to be in a transmissive state and the third layer 907c to be in a reflective state, the spacing between the pair of reflective surfaces of the waveguide 907 can be selected to be d1. By configuring the second layer 907b to be in a reflective state and the third layer 907c to be in a transmissive state, the spacing between the pair of reflective surfaces of the waveguide 907 can be selected to be d1+d2. In this manner, the spacing between the reflective surfaces of the waveguide can be varied. Additional layers can be included in the waveguide to provide a greater range of variation in the spacing.

In some embodiments of the waveguide the reflective surfaces can comprise a piezoelectric material. In such embodiments, the spacing between the reflective surfaces can be varied by inducing mechanical expansion or contraction of the waveguide via the application of an electric field.

1.3. Wavelength

Figure 9C:
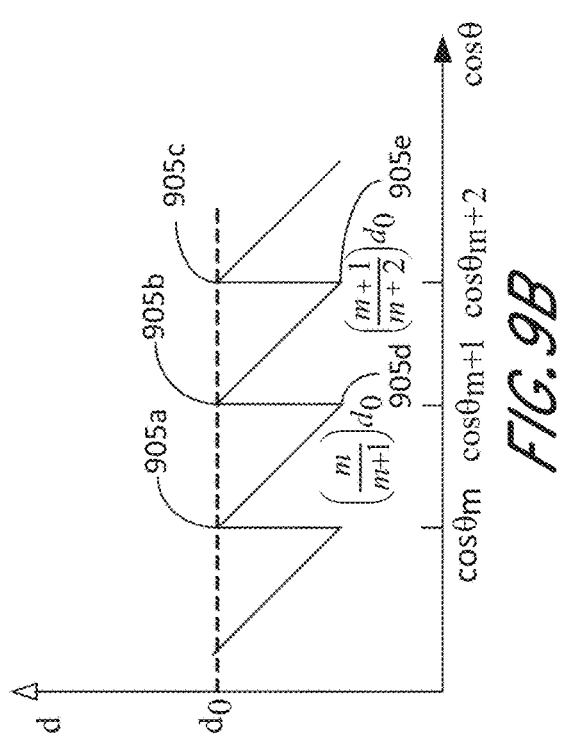
FIG. 9C schematically illustrates a graph that shows the variation of the wavelength λ of the incident light versus cosine of the input angle.

Various embodiments of the waveguide can be configured such that the wavelength of the incident light (e.g., light beam 701) can be varied at a frequency of the scan rate (or at the frequency at which θ varies) such that the optical path length difference Γ=2nd cos θ is an integral multiple of the wavelength λ for all input angles θ. FIG. 9C schematically illustrates a graph which shows the variation of the wavelength λ of the incident light versus cosine of the scan angle θ. The points 910a, 910b and 910c of FIG. 9C refer to the value of the wavelength $\lambda_0$ at scan angles $\theta_m$, $\theta_{m+1}$ and $\theta_{m+2}$ at which the terms 2nd cos $\theta_m$, 2nd cos $\theta_{m+1}$ and 2nd cos $\theta_{m+2}$ are equal to $m\lambda_0$, $(m+1)\lambda_0$ and $(m+2)\lambda_0$ respectively, wherein m is an integer. The wavelength λ at point 910d of FIG. 9C is $$\left(\frac{m+1}{m}\right)$$

$\lambda_0$ at scan angle $\theta_{m+1}$ such that the term 2nd cos $\theta_{m+1}$ is equal to $m\lambda_0$, wherein m is an integer. The wavelength λ at point 910e of FIG. 9C is $$\left(\frac{m+2}{m+1}\right)$$

$\lambda_0$ at scan angle $\theta_{m+2}$ such that the term $$2\left(\frac{m+1}{m+2}\right)$$

$nd_0$ cos $\theta_{m+2}$ is equal to $(m+1)\lambda_0$, wherein m is an integer. In FIG. 9C, m is considered to have a large value such that $$\left(\frac{m+1}{m}\right)$$

$\lambda_0$ is substantially equal to $$\left(\frac{m+2}{m+1}\right)$$

$\lambda_0$. Only some of the possible values of the wavelength λ of the incident light at which 2ndcos θ is an integral multiple of the wavelength λ are depicted in FIG. 9C. Other values of the wavelength λ of the incident light at which 2nd cos θ is an integral multiple of the wavelength λ are possible. For scan angles between scan angles $\theta_m$ and $\theta_{m+1}$ (or $\theta_{m+1}$ and $\theta_{m+2}$) the value of the wavelength λ of the incident light can be changed such that 2nd cos θ remains an integral multiple of the wavelength $\lambda$. For small changes in the value of the wavelength $\lambda$ of the incident light, the variation of the wavelength $\lambda$ of the incident light between scan angles $\theta_m$ and $\theta_{m+1}$ (or $\theta_{m+1}$ and $\theta_{m+2}$) can be linear as depicted in FIG. 9C. The wavelength $\lambda$ of the incident light can be varied by an amount $\Delta\lambda$ that is less than or equal to about 25% of a base wavelength. For example, the wavelength $\lambda$ of the incident light can be varied by an amount $\Delta\lambda$ that is less than or equal to about 10%, less than or equal to about 15%, less than or equal to about 20% of the base wavelength. As another example, wavelength $\lambda$ of the incident light can be varied by an amount $\Delta\lambda$ between about 1 nm and about 10 nm. In various embodiments, the base wavelength can correspond to the wavelength $\lambda 0$ discussed above.

As discussed above, the variation of the wavelength $\lambda$ of the incident light can be synchronized with the variation in the scan angle $\theta$. The variation of the wavelength $\lambda$ of the incident light can be periodic as depicted in FIG. 9C. The wavelength $\lambda$ of the incident light can be varied by employing a tunable laser. For example, the optical source (e.g., light/image source 11 of FIG. 6) can include a tunable laser such as, for example, a distributed feedback (DFB) laser, a distributed Bragg reflector (DBR) laser, etc. in which the wavelength $\lambda$ of the laser can be varied by application of electrical currents and/or voltages. As another example, the wavelength $\lambda$ of the light output from the optical source (e.g., light/image source 11 of FIG. 6) can be varied by varying the temperature of the optical source.

As discussed above, changes in optical wavelength can also produce changes in the refractive index. Accordingly, in various embodiments, the change in the wavelength $\lambda$ of light that is incident on the waveguide can be correlated to the change in the refractive index 'n'. For example, a controller configured to vary the wavelength $\lambda$ of incident light can be configured to take into consideration the change in the refractive index of the material of the waveguide. In various embodiments, the controller can include a feedback loop that is configured to dynamically calculate a change in the wavelength $\lambda$ of the incident light based on the change in the refractive index $\Delta n$ of the waveguide such that phase synchronization between the various light beams of the beamlet array for different scanned angles of the input light beam can be achieved.

In general, for dynamic phase synchronization, the angular spacing, in radians, between the angles that meet the phase synchronization condition is approximately equal to the light's wavelength, divided by the width of the waveguide. The angular shift for waveguide widths and beam diameters of approximately 100 to 1000 microns can be between about 0.001 to 0.01 radians (or a percentage change of about 0.1% to 1%). To maintain phase synchronization, the angular shift can be compensated by decreasing the waveguide's index of refraction by an amount in the range between about 0.001 and about 0.01; increasing or decreasing the spacing between the reflective surface (or width of the waveguide) by approximately 1 micron; or by increasing or decreasing the wavelength of the incident light in a range between about 1 and about 10 nm.

2. Non-Dynamic Phase Synchronization

Phase synchronization can also be achieved without using any of the dynamic approaches discussed above. For example, the waveguide can comprise a plurality of holographic structures, each of the plurality of holographic structures providing a phase synchronized output for each incident angle. Accordingly, a phase synchronized output can be obtained as the incident angle of the input beam varies without actively co-modulating the spacing between the reflective surfaces of the waveguide, the refractive index of the waveguide or the wavelength of the incident light at the scan rate of the input beam.

A first of plurality of holographic structures that provides a phase synchronized output for a first incident angle can be recorded on a thick holographic medium by interfering a first reference beam incident on the holographic medium from a first side of the holographic medium at the first incident angle and a second reference beam incident on the holographic medium from a second side of the holographic medium opposite the first side. The first reference beam can be configured to have the characteristics of the light beam output from a scanning projector. For example, the first reference beam can be collimated in some embodiments. The first reference beam can have a beam diameter of less than or equal to about 100 microns (e.g., less than or equal to 90 microns, less than or equal to 80 microns, less than or equal to 70 microns, less than or equal to 60 microns, less than or equal to 50 microns, less than or equal to 40 microns, less than or equal to 30 microns, less than or equal to 25 microns, less than or equal to 20 microns, or values therebetween). The second reference beam can be configured to have the characteristics of the phase synchronized beamlet array that is output from the waveguide when the first reference beam is incident on the waveguide at the first incident angle. For example, the second reference beam can be a collimated beam having a continuous wavefront with a uniform phase similar to the beamlet array depicted in FIG. 8A-3 and/or FIG. 8C. The beam diameter of the second reference beam can be greater than or equal to about 200 microns and less than or equal to about 10 mm. For example, the beam diameter of the second reference beam can be greater than or equal to about 250 microns and less than or equal to about 950 microns, greater than or equal to about 300 microns and less than or equal to about 900 microns, greater than or equal to about 350 microns and less than or equal to about 850 microns, greater than or equal to about 400 microns and less than or equal to about 800 microns, greater than or equal to about 450 microns and less than or equal to about 750 microns, greater than or equal to about 500 microns and less than or equal to about 700 microns, greater than or equal to about 550 microns and less than or equal to about 650 microns, greater than or equal to about 600 microns and less than or equal to about 650 microns, or values therebetween.

Multiple holographic structures are recorded on the same holographic medium by varying the incidence angle of the first reference beam. For example, the incidence angle of the first reference beam can be continuously varied between about ±30-degrees. As another example, the incidence angle of the first reference beam can be varied between about ±30-degrees in discrete steps that is less than or equal to about 1 degree (e.g., less than or equal to 0.9 degrees, less than or equal to 0.8 degrees, less than or equal to 0.7 degrees, less than or equal to 0.6 degrees, less than or equal to 0.5 degrees, less than or equal to 0.4 degrees, less than or equal to 0.3 degrees, less than or equal to 0.2 degrees, less than or equal to 0.1 degrees, less than or equal to 0.05 degrees, or values therebetween). The angle of incidence of the second reference beam can also be varied corresponding to the variation of the incidence angle of the first reference beam.

Accordingly at least one holographic structure is recorded on the holographic medium for each combination of the angle of incidence of the first reference beam and the angle of incidence of the second reference beam. The waveguide comprising a plurality of holographic structures that are recorded in this manner can be configured to output a phase synchronized beamlet array for an input beam incident at the different angles θ within the solid angle Θ swept by the scanning projector. Furthermore, the diameter of the output beamlet array can be greater than the diameter of the input beam. In such embodiments, angular selectivity is built into the waveguide such that it is not necessary to dynamically synchronize the phase between the various beams of the beamlet array as the angle of incidence of the input light is varied. Thus, in such embodiments, one or more parameters of the waveguide (e.g., refractive index, spacing between the reflective surfaces of the waveguide) and/or the wavelength λ of the incident light need not be varied at the frequency of the scan rate to achieve phase synchronization between the various light beams of the beamlet array output from the waveguide.

Figure 10:
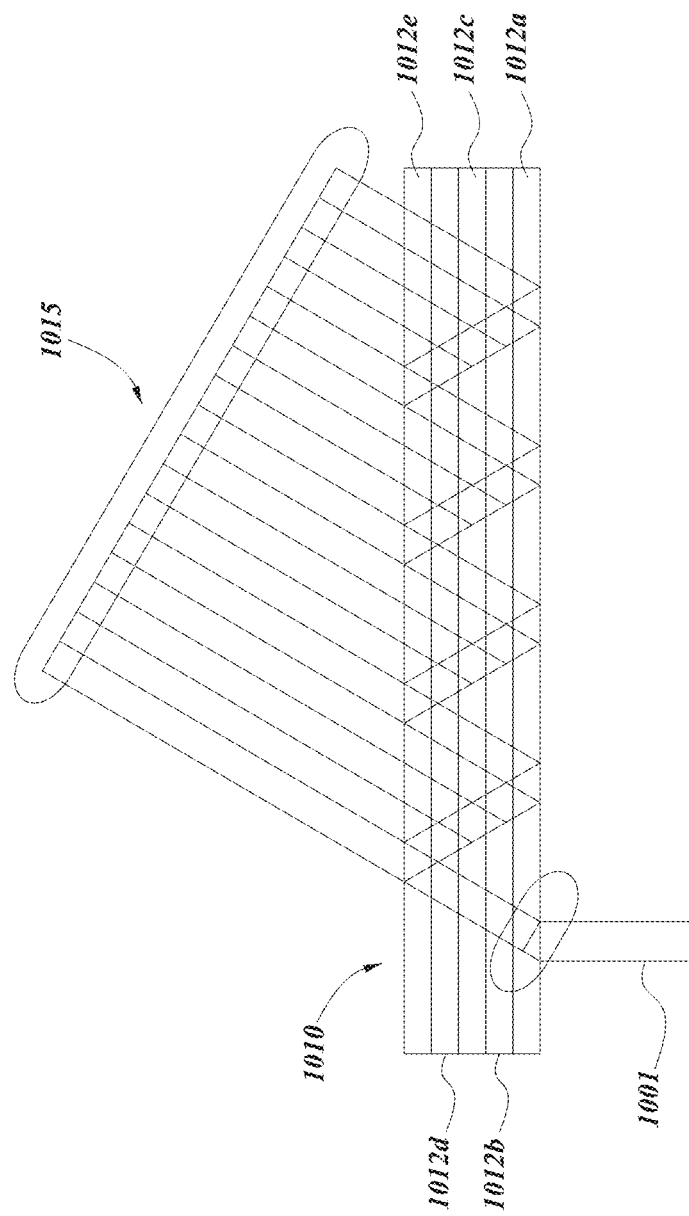
FIG. 10 illustrates an embodiment of waveguide comprising a plurality of spatially multiplexed holographic structures that are configured to output a phase synchronized beamlet array for light incident at variable incident angles.

FIG. 10 illustrates an embodiment of waveguide 1010 in which the angular selectivity is built into the waveguide such that it is not necessary to dynamically synchronize the phase between the various beams of the beamlet array as the angle of incidence of the input light is varied. The waveguide 1010 comprises a stack of layers 1012a, 1012b, 1012c, 1012d. Each stack of layer can include one or more holographic structures. The holographic structures can comprise volume holograms and/or spatially multiplexed Bragg diffraction gratings. In various embodiments, a plurality of holograms can be superimposed or multiplexed in the volume of the waveguide. In such embodiments, the waveguide need not comprise a stack of layers. Each holographic structure can be configured to output a phase synchronized beamlet array for an input beam incident at an angle θ within the solid angle Θ swept by the scanning projector as discussed above. Although, FIG. 10 depicts a phase synchronized beamlet array 1015 that is output by the waveguide 1010 for an input light beam 1001 that is incident at an angle close to a normal to a surface of the waveguide 1010, the waveguide 1010 can also be configured to emit a phase synchronized beamlet array for input beams incident at angles different from an angle close to a normal to a surface of the waveguide 1010.

Each of the processes, methods, and algorithms described herein and/or depicted in the attached figures may be embodied in, and fully or partially automated by, code modules executed by one or more physical computing systems, hardware computer processors, application-specific circuitry, and/or electronic hardware configured to execute specific and particular computer instructions. For example, computing systems can include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some implementations, particular operations and methods may be performed by circuitry that is specific to a given function.

Further, certain implementations of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, a video may include many frames, with each frame having millions of pixels, and specifically programmed computer hardware is necessary to process the video data to provide a desired image processing task or application in a commercially reasonable amount of time.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities can be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto can be performed in other sequences that are appropriate, for example, in serial, in parallel, or in some other manner. Tasks or events may be added to or removed from the disclosed example embodiments. Moreover, the separation of various system components in the implementations described herein is for illustrative purposes and should not be understood as requiring such separation in all implementations. It should be understood that the described program components, methods, and systems can generally be integrated together in a single computer product or packaged into multiple computer products. Many implementation variations are possible.

The processes, methods, and systems may be implemented in a network (or distributed) computing environment. Network environments include enterprise-wide computer networks, intranets, local area networks (LAN), wide area networks (WAN), personal area networks (PAN), cloud computing networks, crowd-sourced computing networks, the Internet, and the World Wide Web. The network may be a wired or a wireless network or any other type of communication network.

The systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. No single feature or group of features is necessary or indispensable to each and every embodiment.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted can be incorporated in the example methods and processes that are schematically illustrated. For example, one or more additional operations can be performed before, after, simultaneously, or between any of the illustrated operations. Additionally, the operations may be rearranged or reordered in other implementations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method comprising:
   receiving a beam into a waveguide at an input angle $\theta$, the waveguide comprising a first edge, a second edge and a pair of reflective surfaces disposed between the first and the second edges, the pair of reflective surfaces separated by a gap having a gap height d, the waveguide comprising a material having a refractive index n, and at least one of the pair of reflective surfaces having a reflectivity r; and
   varying at least one parameter selected from the group consisting of: a wavelength from the plurality of wavelengths, the gap height d, the refractive index n, and the reflectivity r, wherein the variation of the at least one parameter is correlated with variation of the input angle $\theta$ such that a first value of the at least one parameter is associated with a first value of the input angle $\theta$ and a second value of the at least one parameter is associated with a second value of the input angle $\theta$ and not with the first value of the input angle $\theta$.

2. The method of claim 1, wherein varying the at least one parameter comprises varying the input angle $\theta$ at a scan rate.

3. The method of claim 1, wherein varying the at least one parameter comprises varying the at least one parameter at a rate substantially equal to a scan rate.

4. The method of claim 1, wherein the least one parameter is the wavelength from the plurality of wavelengths.

5. The method of claim 1, wherein the least one parameter is the gap height d.

6. The method of claim 1, wherein the least one parameter is the refractive index n.

7. The method of claim 1, wherein the least one parameter is the reflectivity r.

8. The method of claim 1, wherein the beam is collimated.

9. The method of claim 1, wherein the waveguide comprises an acousto-optic material.

10. The method of claim 1, wherein the waveguide comprises a piezo-electric material.

11. The method of claim 1, wherein the waveguide comprises an electro-optic material.

12. The method of claim 1, wherein the waveguide comprises a micro-electro mechanical system (MEMS).

13. The method of claim 1, wherein the waveguide is configured as an exit pupil expander that expands and multiplies the emitted beam.

14. The method of claim 1, wherein the waveguide is configured to expand the beam to a spot size greater than 1 mm.

15. The method of claim 1, wherein the waveguide is integrated in an augmented reality (AR) device.

16. The method of claim 1, wherein the waveguide is integrated in a near-to-eye display device.

17. The method of claim 1, wherein the waveguide is integrated in a virtual reality (VR) device.

18. The method of claim 1, wherein the waveguide is integrated in eyewear comprising at least one of: a frame, one or more lenses or ear stems.

* * * * *